United States Patent [19]

Nagashima et al.

[11] Patent Number: 5,057,928
[45] Date of Patent: Oct. 15, 1991

[54] DRIVE APPARATUS FOR LIQUID CRYSTAL DISPLAY DEVICE UTILIZING A FIELD DISCRIMINATING APPARATUS

[75] Inventors: Nobuyoshi Nagashima; Toshio Matsumoto, both of Tenri; Shuhei Yasuda, Nara; Takafumi Kawaguchi, Nara; Makoto Takeda, Nara, all of Japan

[73] Assignee: Sharp Kabushiki Kaisha, Osaka, Japan

[21] Appl. No.: 291,766

[22] Filed: Dec. 29, 1988

[30] Foreign Application Priority Data

Dec. 29, 1987 [JP] Japan ............................. 62-333972
Dec. 29, 1987 [JP] Japan ............................. 62-333973
Sep. 5, 1988 [JP] Japan ............................. 63-223020

[51] Int. Cl.[5] .............................................. H04N 5/70
[52] U.S. Cl. ................................. 338/236; 358/148; 358/153; 340/784
[58] Field of Search ............... 340/784, 765; 358/236, 358/148, 153

[56] References Cited

U.S. PATENT DOCUMENTS

| | | | |
|---|---|---|---|
| 4,393,379 | 7/1983 | Berting et al. | 340/784 |
| 4,455,576 | 6/1984 | Hoshi | 358/236 X |
| 4,635,127 | 1/1987 | Togashi | 358/236 |
| 4,694,348 | 9/1987 | Kamiya et al. | 358/236 |
| 4,694,349 | 9/1987 | Takeda et al. | 358/236 X |
| 4,789,899 | 12/1988 | Takahashi et al. | 358/236 |
| 4,792,857 | 12/1988 | Akiyama | 358/236 |

Primary Examiner—James J. Groody
Assistant Examiner—Mark R. Powell

[57] ABSTRACT

The invention relates to a drive apparatus for a liquid crystal display device. The voltage, to be applied to longitudinally and latitudinally arranged liquid crystal cells of the liquid crystal display device, is altered in polarity from field to field and from frame to frame, whereby the occurrence of flicker is prevented. The field discriminating device counts the numbers of lines in first and second fields by synchronizing a vertical synchronizing signal at a leading point of a field time. Thereafter the difference in the number of lines between the first and second fields is detected, the field times being thereby discriminated. When a video signal is erroneous, the field discriminating device provides a field discriminating signal, the level of which is changed alternately from field time to field time.

6 Claims, 19 Drawing Sheets

— FIRST FIELD TIME
- - - - SECOND FIELD TIME

OPTICAL RESPONSE ON A LIQUID CRYSTAL DISPLAY
480 LINE FRAMES

480 LINE FRAMES +1H Rev ary to discriminate the first field time from the second field time through a discrimination circuit provided specially for the purpose. Therefore, field discrimination is carried out in an area such as computer operation with respect to video signals, for which purpose the following technique is employed, for example. As FIG. 7 illustrates, a signal with a duty ratio of about 50% is generated for each individual line. Further, the logic level of the signal relative to a vertical synchronizing signal is detected. This is, the level of the signal at the point in time at which the vertical synchronizing signal is generated. It is detected on the basis of which detection a field discrimination signal is outputted. FIGS. 8 and 9 show wave forms of signals for various elements in the FIG. 7 block diagram during the respective vertical blanking time portions of first field time and second field time.

DRIVE APPARATUS FOR LIQUID CRYSTAL DISPLAY DEVICE UTILIZING A FIELD DISCRIMINATING APPARATUS

BACKGROUND OF THE INVENTION

The present invention relates to a drive apparatus which generates drive signals for driving a liquid crystal display device.

FIG. 1 is an equivalent circuit diagram for a conventional active matrix type liquid crystal display device. Thin film transistors (TFT) 31 and liquid crystal cells 32 are arranged in longitudinal and latitudinal directions to constitute a liquid crystal display surface. Gates of the latitudinally arranged TFT are connected to same scanning electrodes (gate electrodes). Sources of the longitudinally arranged TFT are connected to same signal electrodes (source electrodes). Signal electrodes $S_1$–$S_n$ are connected to a data latch circuit 30 which latches a display signal for one scan of video signals on a signal line DS. One electrode of each liquid crystal cell is connected to a drain of a TFT, and other electrode of the cell is connected to a common electrode, COM.

FIG. 2 shows voltage wave forms applied individually to the signal electrodes, the common electrode, the scanning electrodes, and the liquid crystal cells. A video signal for one horizontal scanning time 1H on the signal line DS is latched by the data latch circuit 30 so that it is provided from the signal electrodes $S_1$–$S_n$. When the voltage level at the scanning electrodes becomes high, a liquid crystal drive voltage corresponding to the difference between the voltage on the signal electrodes $S_1$–$S_n$, and the voltage on the common electrode COM, is applied to the liquid crystal cells.

During a first field time, the voltage level at gates $G_1$, $G_3$ becomes high because of scanning signals (line sequential panel signals corresponding to horizontal synchronizing signals), and the liquid crystal drive voltage is applied to the liquid crystal cells. The voltage at gages $G_2$, $G_4$ is then at a low level. Similarly, during a second field time, gates $G_2$, $G_4$ sequentially go to a high level condition in accordance with scanning signals, and the liquid crystal drive voltage is applied to the liquid crystal cells. Gates $G_1$, $G_3$ are then in a low level condition, and the liquid crystal drive voltage applied during the first field time is retained. In this way, the display device is sequentially driven with polarity inverted in predetermined frame time intervals.

When the liquid crystal display device is driven with polarity inverted in such a way according to a conventional interlaced scanning system, the liquid crystal driving frequency occurring in the case of NTSC-TV (National Television System Committee) signalling amounts to one half of a frame frequency, or 15 Hz. Further, as FIG. 3 shows, an optical response spectrum on the liquid crystal display surface presents a high peak at 15 Hz, thus causing flicker.

In the conventional liquid crystal display unit, it is required that gate signals be sent first to scanning electrodes corresponding to the first field time and then to scanning electrodes corresponding to the second field time. Accordingly, it is necessary to determine, with respect to the display signals latched by the data latch circuit 30, whether they are display signals for the first field time or display signals for the second field time. Therefore, it is necessary to produce field discrimination signals for distinguishing one field time from the other on the basis of horizontal synchronizing signals and vertical synchronizing signals.

According to the existing practice of interlaced scanning, as FIG. 4 shows, scanning, as indicated by solid line, is carried out for each first field time and scanning as indicated by broken line is carried out for each second field time. Scanning for one combined period of a first field time and a second field time defines one frame period.

FIG. 5 shows a wave form of composite video signals for a vertical blanking time during a first field time, and FIG. 6 is a wave form of composite video signals for a vertical blanking time during a second field time. For the convenience of subsequent explanation, individual horizontal scanning times (lines) for composite video signals are numerically designated. It is noted that the following explanation is given on the basis of standard values of NTSC signals. Other standards, such as PAL (Phase Alternation by Line) and SECAM (Séquentiel Couleur á Mémoire), will be discussed hereinafter.

A first line of the vertical blanking time portion of the first field time is taken as first, followed by second and third. The vertical blanking time portion of second field time begins from a median point of the 263rd line, and a next first line starts after the 525th line.

In a conventional CRT display, interlaced scanning can be done only by regenerating vertical synchronizing signals and applying a deflecting voltage through a vertical deflection circuit on the basis of the regenerated vertical synchronizing signals, it being not neces- In such conventional field discrimination, it is necessary to generate signals of exactly 50% in duty ratio. For this purpose that high frequency signals, that are several times to several tens of times as high as the frequency of a horizontal synchronizing signal, are required. This naturally necessitates a larger and more complex circuit.

Now, in a liquid crystal display device, scanning is switched over between first field time and second field time on the basis of a field discrimination signal. Therefore if an erroneous field discrimination signal is issued, an abnormal operation may occur such that an image for only one field is displayed, or no image is displayed, on the liquid crystal display screen. In order to prevent such trouble, therefore, the usual practice has been to provide a circuit for correcting such abnormal operation if an abnormal field discrimination signal is provided from the field discrimination unit. FIG. 10 is a circuit diagram schematically showing a conventional field discrimination unit which provides field discriminating signals for discriminating one field from the other, of a first field time and a second field time with respect to video signals of above-mentioned interlaced scanning type, on the basis of a composite synchronizing signal added to each video signal.

In FIG. 10, as shown by 35, is a synchronizing signal generating circuit which receives composite synchronizing signals added to video signals and generates a low level synchronizing signal RES for each leading point of time of each frame. It also generates high level synchronizing signals CK for each first field time and each second field time. Shown by 36 is a discriminating signal output circuit which receives the synchronizing signals RES and CK from the synchronizing signal generating circuit 35 and outputs field discriminating signals FP. This circuit consists of a D-flip-flop circuit.

The synchronizing signal RES provided by the synchronizing signal generating circuit 35 is transmitted as a reset signal to the D-flip-flop circuit, while the synchronizing signal CK is given as a clock signal. An inverted output terminal $\overline{Q}$ of the D-flip-flop circuit is connected to a data input terminal D, and a field discriminating signal FP is provided from the inverted output terminal $\overline{Q}$.

FIG. 11 is timing chart illustrating the operation of the field discriminating unit.

FIG. 12 shows relative phases of synchronizing signals RES and CK, in which the synchronizing signals RES and CK are identical in pulse length. Further, they are overlapping in relation: synchronizing signals CK are caused to lag a slight period of time $\Delta t$ behind synchronizing signals RES. As can be seen from FIG. 11, a synchronizing signal CK is generated with a lag of time $\Delta t$ relative to the leading end of a frame (the front end of second field time). Similarly, at the leading end of a first field time, at which it does not overlap a synchronizing signal, a synchronizing signal is generated with a lag of time $\Delta t$ relative to the leading end.

In the field discriminating unit, when synchronizing signal RES is transmitted as a reset signal to a reset input terminal R of the discriminating signal output circuit 36 at the leading point of time of a frame, the output of the inverted input terminal $\overline{Q}$, or field discriminating signal FP, shifts to a high level state and such output condition is kept as it is. It is not influenced by a synchronizing signal to be given as a clock signal with a time lag of $\Delta t$.

Subsequently, when synchronizing signal CK is transmitted to the discriminating signal output circuit 36 at the leading part of the first field time, the field discriminating signal FP is inverted from high level to low level in synchronism with the generation of the synchronizing signal CK. Then, at the leading point of time of a next following frame, when the synchronizing signal RES is transmitted to the discriminating signal output circuit 36, the frame discriminating signal FP is inverted from a low level to a high level. In this way, the field discriminating signal FP shifts to a high level during the second field time and to a low level during the first field time, such a cycle of operation is repeated.

The above described manner of operation represents the case where no error is involved in video signals. However, where a video tape is used as a source of signals for trick regeneration or where video signals involve considerable noise, or where the device is connected to a video signal source of an interlaced (field fixed), erros may often occur in video signalling. Thus, signals for one field only are continually provided as field discriminating signals, or signals are provided with which field discrimination is totally impossible.

In any such case, there is no change in field discrimination signals FP between the first field time and the second field time. Therefore, display for one field only is made in regenerating devices, such as liquid crystal display device. When a liquid crystal display device, in particular, is to be driven, it is particularly necessary to drive a liquid crystal layer by ac power. Therefore, unless voltage is applied to scanning lines corresponding to one of the field, the corresponding portion is disabled to display. Thus, the display performance of the device is noticeably degraded or the device becomes totally inoperable.

FIGS. 13A through 13D are timing charts showing normal operation of the field discriminating unit in comparison with various aspects of possible misfunction. FIG. 13A illustrates a normal pattern of operation, while FIGS. 13B to 13D show cases of misfunction by way of example.

FIG. 13B shows an instance in which there has been no generation of a synchronizing signal RES for some period of time, in which case the level of the field discriminating signal FP is inverted, instead of that of the synchronizing signal RES, each time synchronizing signal CK is generated. In this case, the field discriminating signal FP is inverted periodically, though not accurately, and therefore the trouble involved is relatively insignificant.

FIG. 13C shows a phenomenon which may occur when operation returns from a malfunctional condition to normal condition, in which case output timing for synchronizing signal RES delays one field time. In such a case, identical field discriminating signals FP are successively generated for some periods of time. However this is merely a temporary phenomenon and is therefore of minor nature.

On the other hand, FIG. 13D represents a case in which synchronizing signals RES are continuously provided for consecutive one-field periods, in which case field discriminating signals FP are continually kept at constant level. This poses a serious problem as stated above.

SUMMARY OF THE INVENTION

It is a first object of the invention to provide a drive apparatus for a liquid crystal display device which eliminates the possibility of flicker occurrence.

In order to accomplish this object, the invention provides a drive apparatus for a liquid crystal display device wherein a matrix type liquid crystal display device, having a plurality of liquid crystal cells, which are individually equipped with switching elements, is caused to have a liquid crystal drive voltage applied thereto through the switching elements. Interlaced scanning is thus carried out for a plurality of field times for video display. The apparatus comprises: a horizontal scanning time detecting device for detecting each horizontal scanning time, and a device for inverting the liquid crystal drive voltage to be applied to the liquid crystal cells through the switching elements for each horizontal scanning time in response to the output of the horizontal scanning time detecting device.

In a preferred embodiment, the drive apparatus for a liquid crystal display device further comprises a device for detecting each field time, and a device for inverting the liquid crystal drive voltage to be applied to the liquid crystal drive cells through the switching elements for each field time in response to the output of the field time detecting device means.

In a further preferred embodiment, the switching elements are thin film transistors and the liquid crystal display device is of the active matrix type.

According to the invention, it is possible to suppress flickering of the liquid crystal display and get good quality on the liquid crystal image display.

It is a second object of the invention to provide a device which can make field discriminating signals readily available for discriminating a first field time and a second field time from one another.

In order to accomplish the above object, the invention provides a field discriminating device for supply discriminating signals which enable first and second field times to be discriminated from one another, through utilization of TV signals of an interlaced mode.

The device comprises a first circuit for generating horizontal synchronizing signals, a second circuit for generating vertical synchronizing signals, an a third circuit for generating a pulse signal upon generation of an output pulse signal at the first circuit immediately after generation of an output pulse signal at the second circuit. It further contains a counter circuit for counting the number of output pulses received from the first circuit which is initialized by the output signal from the third circuit and a delay circuit for delaying an output signal from the counter circuit for one cycle of the horizontal synchronizing signals. A fourth circuit is provided for detecting the output signal level of the delay circuit at the time of output signal level of the delay circuit at the time of output signal generation at the third circuit. Further, a composite synchronizing signal based on the TV signals is applied to the input terminals of the first and second circuits and a field discriminating signal is outputted from the output terminal of the fourth circuit.

According to the invention, it is possible to perform field discrimination through a very simple circuit arrangement. Further, where a matrix type display is employed, the circuit arrangement can be further simplified.

It is a third object to provide a field discriminating device which can provide field discriminating signals of which levels are alternately changeable in predetermined field time intervals, even if video signals happen to be erroneous.

In order to accomplish the above object, the invention provides a field discriminating device, including a synchronizing signal generating circuit, which generates a first synchronizing signal at each leading point of time during one frame and a second synchronizing signal at a point of time slightly behind the leading point of time of each field on the basis of a composite synchronizing singal added to a video signal of an interlaced mode. Here one frame is displayed by a combination of a first field time for which an odd numbered scanning line is selected and a second field time for which an even numbered scanning line is selected.

A discriminating signal generating circuit is included for providing field discriminating signals, of which levels are inverted at the point of time of generation of the second synchronizing signal, without overlapping with the first synchronizing signal, and of which a first level corresponding to one of the first and second field times is retained after generation of the first synchronizing signal and until generation of a next second synchronizing signal which does not overlap a next first synchronizing signal.

It is further adapted to output discriminating signals which, when the first and second synchronizing signal are normal, are of a first level corresponding to one of the first and second field times for the period of from generation of a first synchronizing signal and until generation of a next second synchronizing signal. Further, they are of a second level corresponding to the other of the first and second field times for the period of from generation of the second synchronizing signal and until generation of a next first synchronizing signal. The field discriminating device comprises:

a correction circuit which, if a first synchronizing signal which overlaps a second synchronizing signal is generated, and if an erroneous synchronizing first signal which overlaps a next second synchronizing signal is generated, performs correction at if the erroneous first synchronizing signal were not generated.

According to the invention, when the first synchronizing signal, which overlaps the second synchronizing signal, even if the erroneous first synchronizing signal which overlaps the next second synchronizing signal occurs, the correction circuit performs correction as if the erroneous first synchronizing signal were not generated. Therefore field discrimination signals provided are inverted in their levels in the predetermined field time intervals so that there is no possibility of a display being biased toward one field in a regenerating device. Any possible degradation in display performance, due to an error in video signals, can thus be effectively prevented.

These and further objects of the present invention will become more readily apparent from a better understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein.

DETAILED DESCRIPTION OF THE INVENTION

Figure 14:
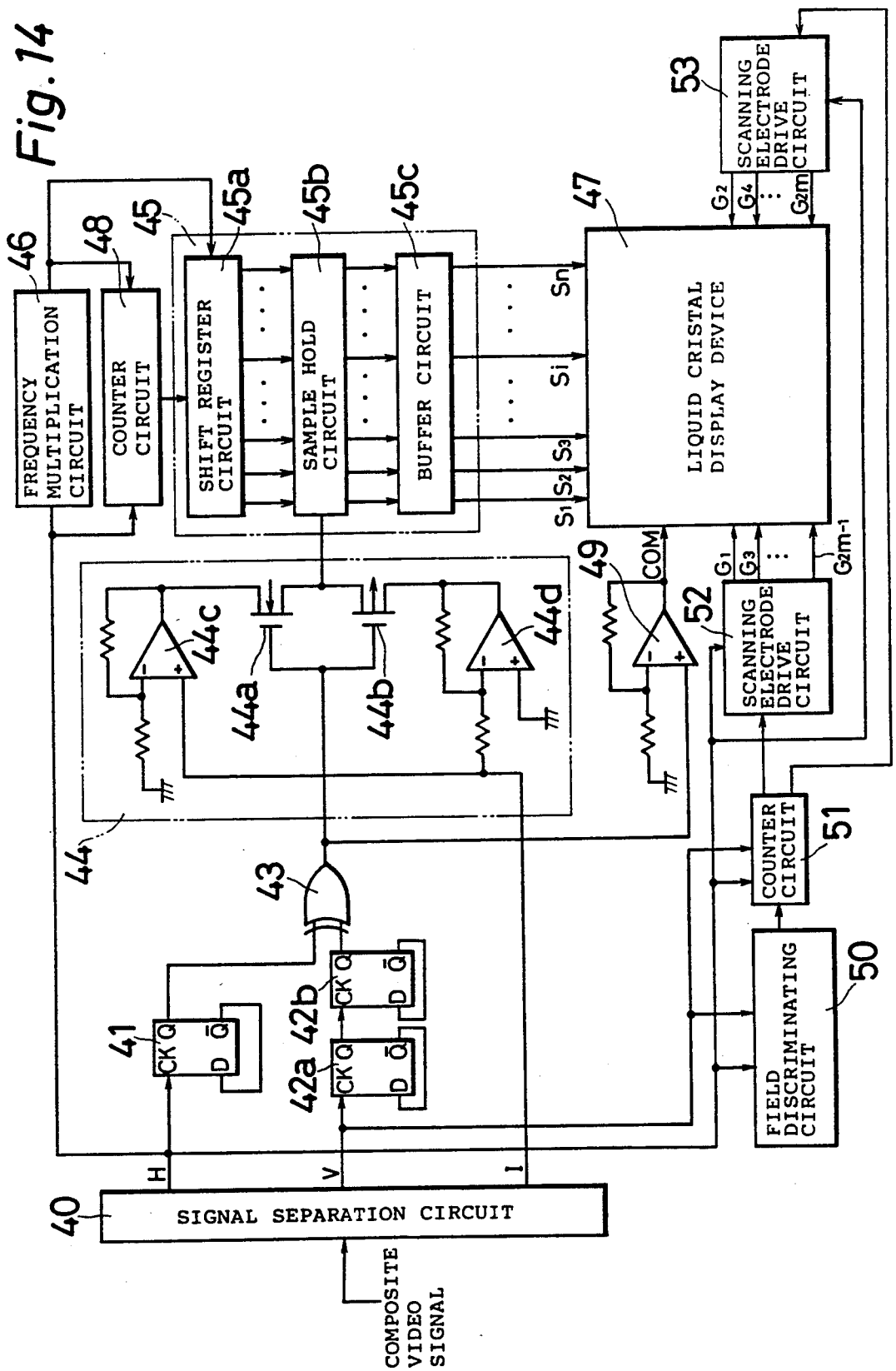
FIG. 14 is a drive circuit diagram for a liquid crystal display device representing one embodiment of the invention.

FIG. 14 is a drive circuit diagram for a liquid crystal device showing one embodiment of the invention. When a composite video signal is given to a signal separation circuit 40, a horizontal synchronizing signal H, a vertical synchronizing signal V, and an image signal I are provided. The horizontal synchronizing signal H is transmitted to a flip-flop circuit 41, and an inversion signal synchronized with the horizontal synchronizing signal is provided from an output terminal Q. Similarly, the vertical synchronizing signal is transmitted to the flip-flop circuit 42a, and an inversion signal synchronized with a vertical synchronizing signal is provided from the output terminal Q of a flip-flop circuit 42b. These liquid crystal driving inversion signals are given to an exclusive "or" gate circuit 43, and an inverting signal is provided once each horizontal time and each frame time. This signal, along with the image signal, is transmitted to a video signal inversion circuit 44. When a transistor 44a is on and a transistor 44b is off, the video signal is amplified by an amplifier circuit 44c. It is then transmitted to a sample hold circuit 45b of a signal electrode drive circuit 45. When the transistor 44b is on and the transistor 44a is off, the video signal is inverted by amplifier circuit 44d. It is then transmitted to the sample hold circuit 45b.

Figure 15:
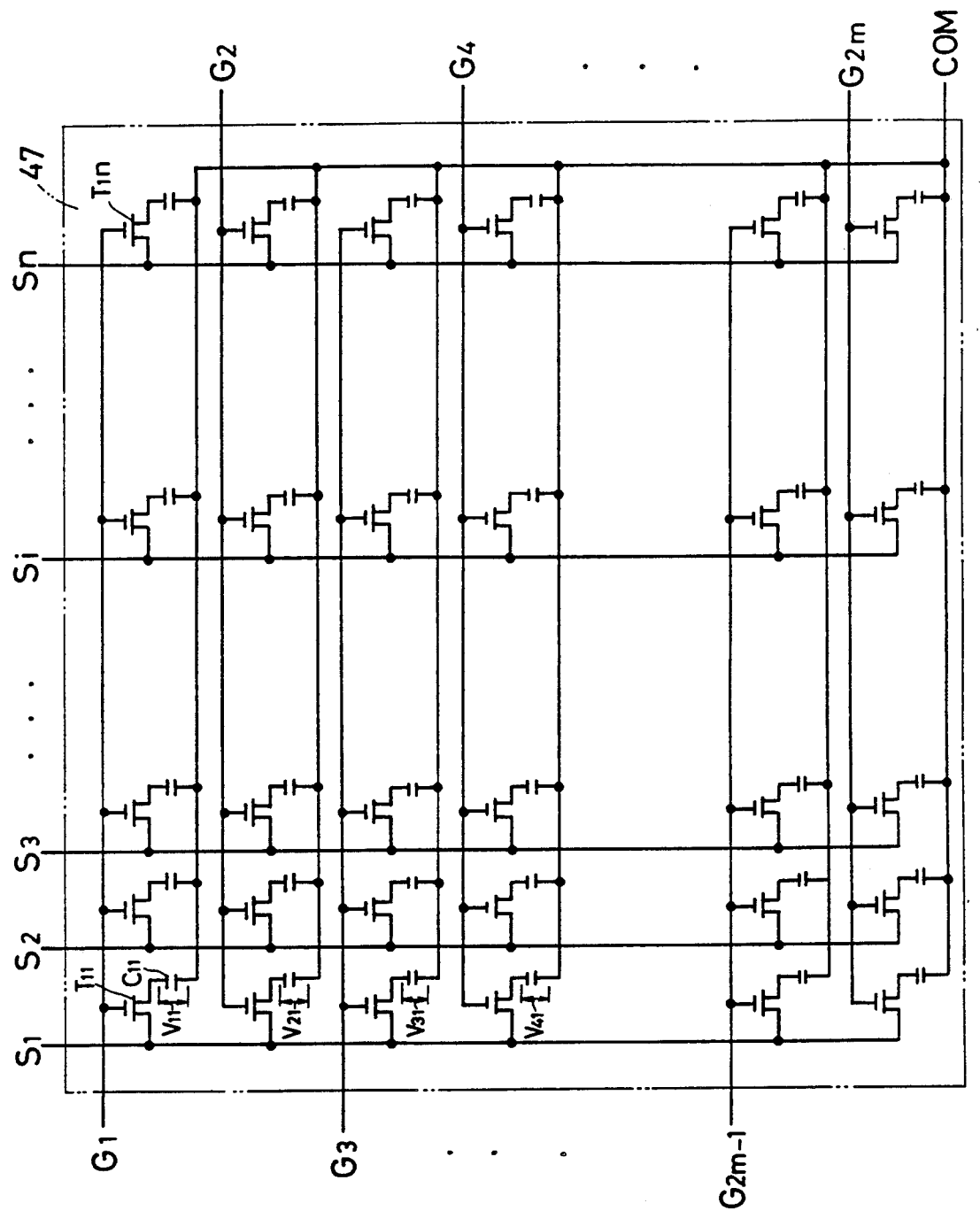
FIG. 15 is an equivalent circuit diagram representing the liquid crystal display device.

The horizontal synchronizing signal H, after its repetition frequency is increased by a frequency multiplication circuit 46, is transmitted as a clock signal to a shift register circuit 45a. A start pulse, transmitted from a counter circuit 48 to a shift register circuit 45a, is obtained by counting a clock signal provided from the frequency multiplication circuit 46. The repetition frequency of the clock signal provided from the frequency multiplication circuit 46 is determined correspondingly to the number of thin film transistors $T_{1i}$-$T_{1n}$ arranged for one horizontal scanning in the liquid crystal display device 47 shown in FIG. 15, that is, the number n of signal electrodes $S_1$-$S_n$. Display data for one horizontal time sampled from video signals by the sampling hold circuit 45b is applied from a buffer circuit 45c to individual signal electrodes $S_1$-$S_n$. Output signals from the exclusive "or" circuit 43 are applied from a common electrode signal generating circuit 49 to a common electrode COM of a liquid crystal display panel 47.

The horizontal synchronizing signal H and the vertical synchronizing signal V are input to a field discriminating circuit 50, and field discriminating signals are provided to a vertical synchronizing signal counter circuit 51. The field discriminating signals are such that they are inverted in every other first and second field times. The vertical synchronizing signal counter circuit 51 supplies to scanning electrode drive circuits 52, 53 a start signal for output change with respect to gate signals to be applied to the liquid crystal display device 47. The scanning electrode drive circuit 52 provides gate signals for a first field time to scanning electrode $G_1$-$G_{2m-1}$ in synchronism with the horizontal synchronizing signal H. The scanning electrode drive circuit 53 provides gate signals for a second field time to scanning electrodes $G_2$-$G_{2m}$ in synchronism with the horizontal synchronizing signal H.

In this way, by turning on thin film transistors through gate signals, display signals held in the sample hold circuit 45b for one horizontal time period are provided for each horizontal time period. Thus interlaced scanning is possible on a line sequential basis. A liquid crystal drive voltage is applied to individual liquid crystals of the liquid crystal display device 47. The drive voltage corresponds to the difference between the voltage applied to the scanning electrodes and the voltage applied to the common electrode.

Figure 16:
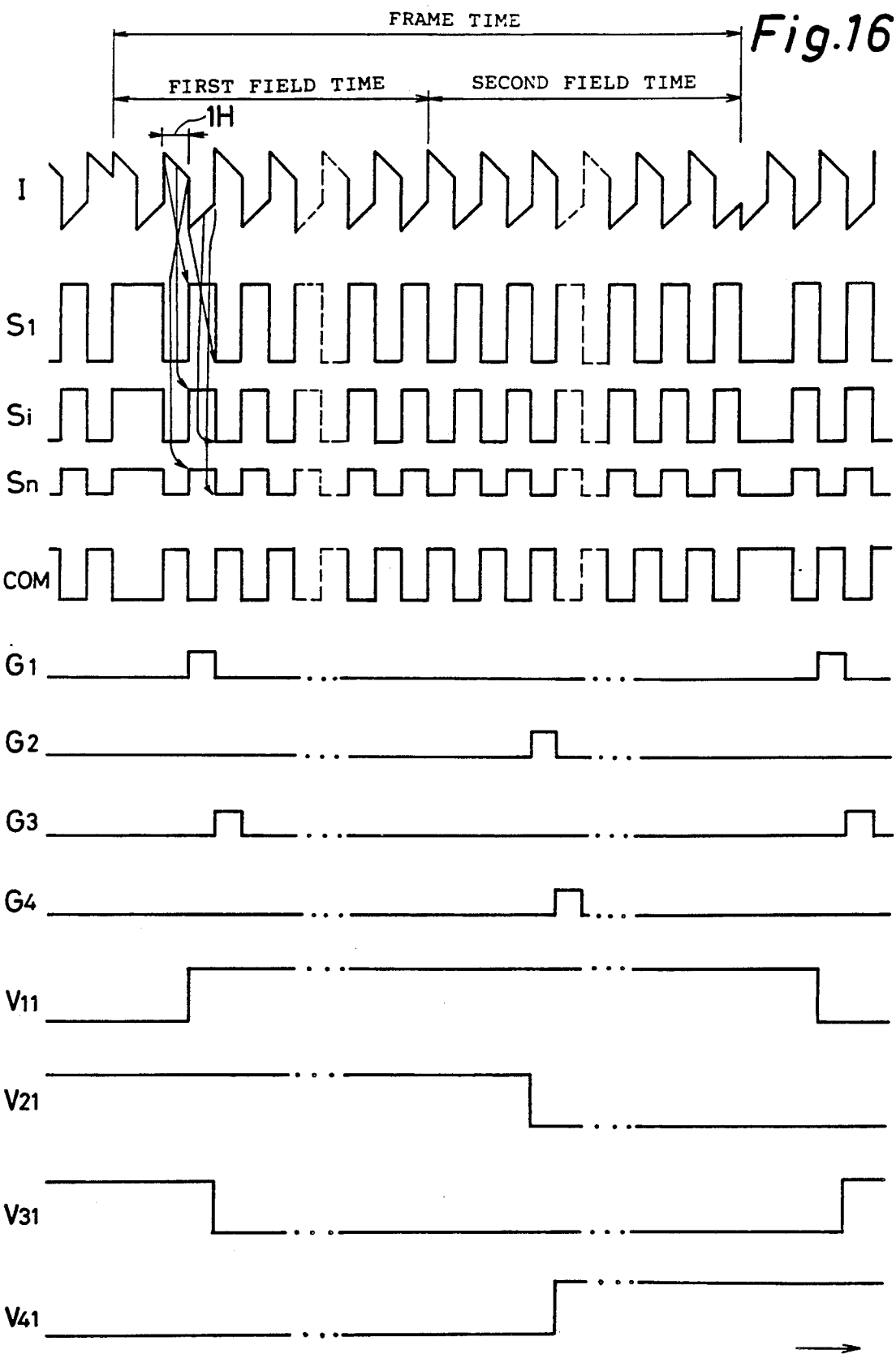
FIG. 16 is a diagram of signal wave forms at various parts of the FIG. 14 circuit.

FIG. 16 is a diagram showing signal wave forms at various parts of the circuitry shown in FIG. 14. Video signals I are sampled in synchronism with clock signals outputted from the frequency multiplication circuit 46 within one horizontal time 1 H. Then sample hold voltage is determined according to the level of the image signals I. A signal voltage which has been held in the sample hold circuit 45 is applied to signal electrodes $S_1$-$S_n$. Considering the liquid crystal $C_{11}$ shown in FIG. 15, for example, when a high level voltage is applied to scanning electrode $G_1$, thin film transistor $T_{11}$ is turned on and the voltage on signal electrode $S_1$ is applied to one of the electrodes in the liquid crystal cell $C_{11}$ through a drain of the thin film transistor $T_{11}$. Further, the common electrode voltage on the common electrode COM is applied to the other electrode in liquid crystal cell $C_{11}$. Accordingly, the difference between those voltages is a liquid crystal drive voltage $V_{11}$ to be applied across the liquid crystal cell $C_{11}$.

Figure 17:
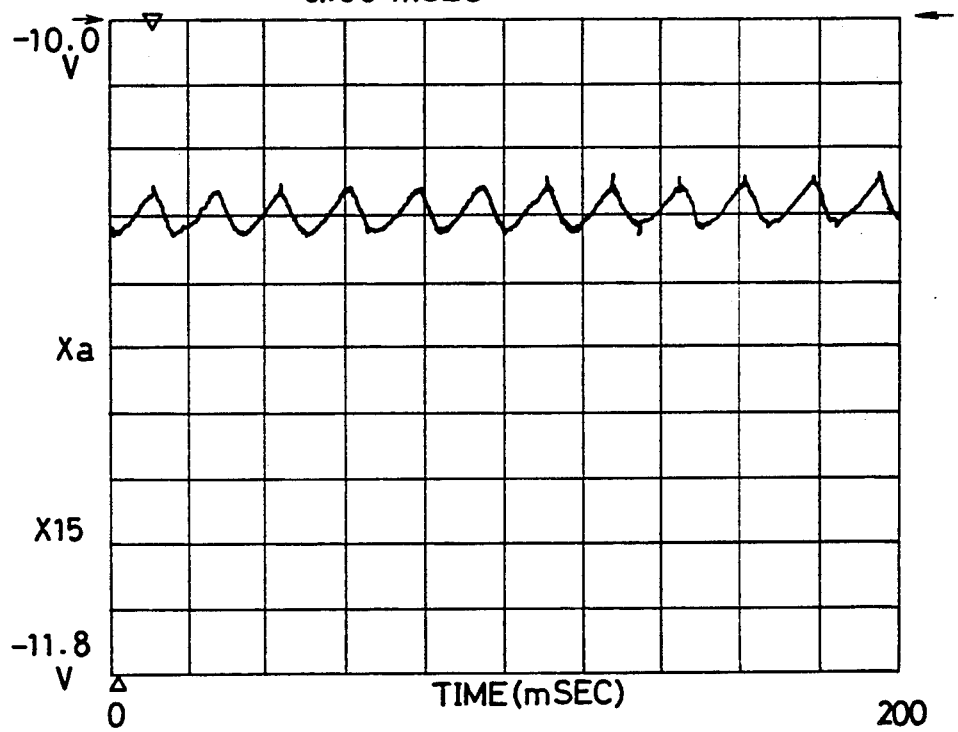
FIG. 17 is a diagram showing by way of example optical response measurements according to the drive system of the invention.
Figure 18:
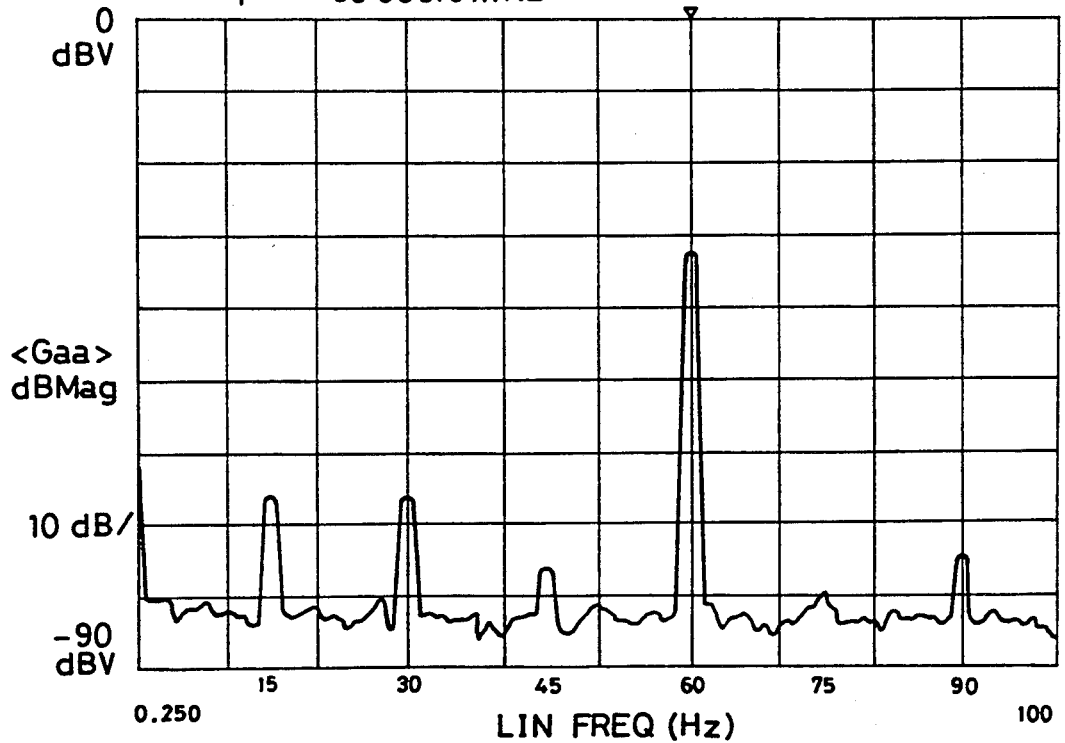
FIG. 18 is a view showing an example of actual measurements of optical response according to the drive system of the invention.

FIG. 17 shows by way of example optical response measurements according to the drive system of the invention. An optical spectral distribution of the responses is given in FIG. 18. As can be understood from FIG. 18, a frequency component of 60 Hz is seen as a peak value, though frequency components of 15 Hz are also seen and 30 Hz. An orderly wave form of a 60 Hz frequency has thus been confirmed which represents an advantage of the invention over the conventional drive system. Such orderly wave forms show that generation of irregular frequency components, which may be a cause of flicker, can be effectively suppressed.

Figure 19:
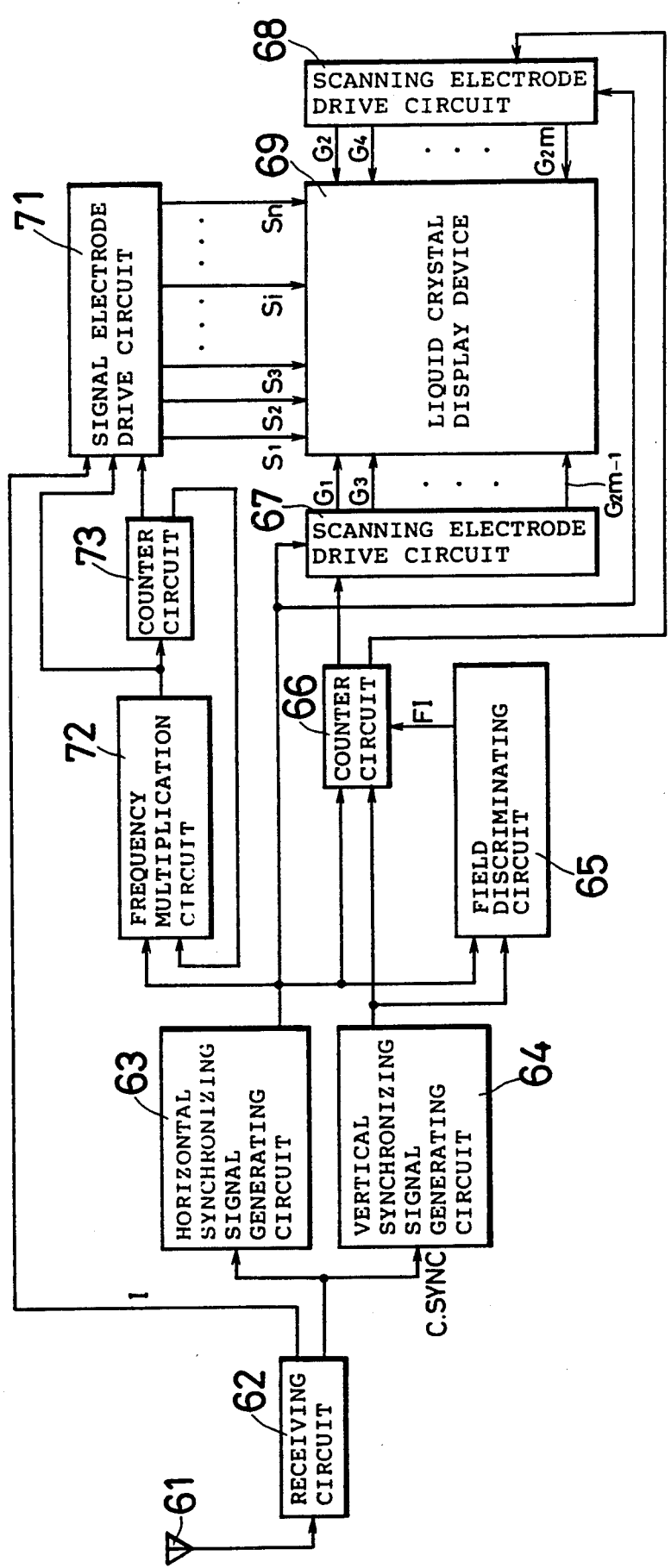
FIG. 19 is a block diagram showing a liquid crystal display system representing one embodiment of the invention.

FIG. 19 is a block diagram showing a liquid crystal display device having a field discrimination circuit as one embodiment of the invention. A broadcast wave received by an antenna 61 is separated into video signal I and a composite synchronizing signal C. SYNC by receiver circuit 62. The composite synchronizing signal C. SYNC is transmitted to a horizontal synchronizing signal generating circuit 63 and a vertical synchronizing signal generating circuit 64. From this a horizontal synchronizing signal and a vertical synchronizing signal are provided.

The field discriminating circuit 65 generates a field discriminating signal FI for discriminating the first field time, and the second field time one from the other, on the basis of the horizontal and vertical synchronizing signals. It provides the same to a vertical synchronizing signal counter circuit 66. The vertical synchronizing signal counter circuit 66 provides start signals to gate electrode drive circuits 67, 68. The start signals are generated on the basis of the horizontal and vertical synchronizing signals. Further start signals serve as basic times for generation of gate signals for first and second field times. The start signal to be provided to the scanning electrode drive circuit 67 which provides gate signals for a first field time to the liquid crystal display device 69, and the start signal for initiating generation of gate signals for a second field time, are switched over, from one to the other, by a field discriminating signal FI. The scanning electrode drive circuits 67, 68 supply gate signals to the liquid crystal display device 69 in synchronism with horizontal synchronizing signals, from the horizontal synchronizing signal generating circuit 63.

The liquid crystal display device 69 has a plurality of signal electrodes and a plurality of scanning electrodes individually arranged in crossing relation within a panel. It further contains a multiplicity of liquid crystal cells arranged in matrix form at individual intersecting points of the electrodes. The drive circuit for liquid crystal driving is connected to individual signal lines and a voltage is supplied from the drive circuit to individual liquid crystal cells.

A signal electrode drive circuit 71 supplies a display signal voltage through signal electrodes $S_1$–$S_n$ to individual liquid crystal cells for one horizontal scanning period. The signal electrode drive circuit 71 incorporates a sample and hold circuit for sampling video signal during one horizontal scanning time. Thus the display signal voltage supplied to the liquid crystal cells takes a sample of, and stores same therein, image signals from a receiving circuit 62 on the basis of clock signals outputted from the frequency multiplication circuit 72. The counter circuit 73 generates a start signal, on the basis of clock signals from the frequency multiplication circuit 72, to enable the signal electrode drive circuit 71 to sample video signals I. The counter circuit 73 provides a control signal to the frequency multiplication circuit 72, which in turn adjusts, on the basis of the control signal, repetition frequency of clock signals to be supplied to the signal electrode drive circuit 71. The repetition frequency is adjusted so that the signal electrode drive circuit 71 has such a number of samples that corresponds to the number of signal electrodes.

Figure 20:
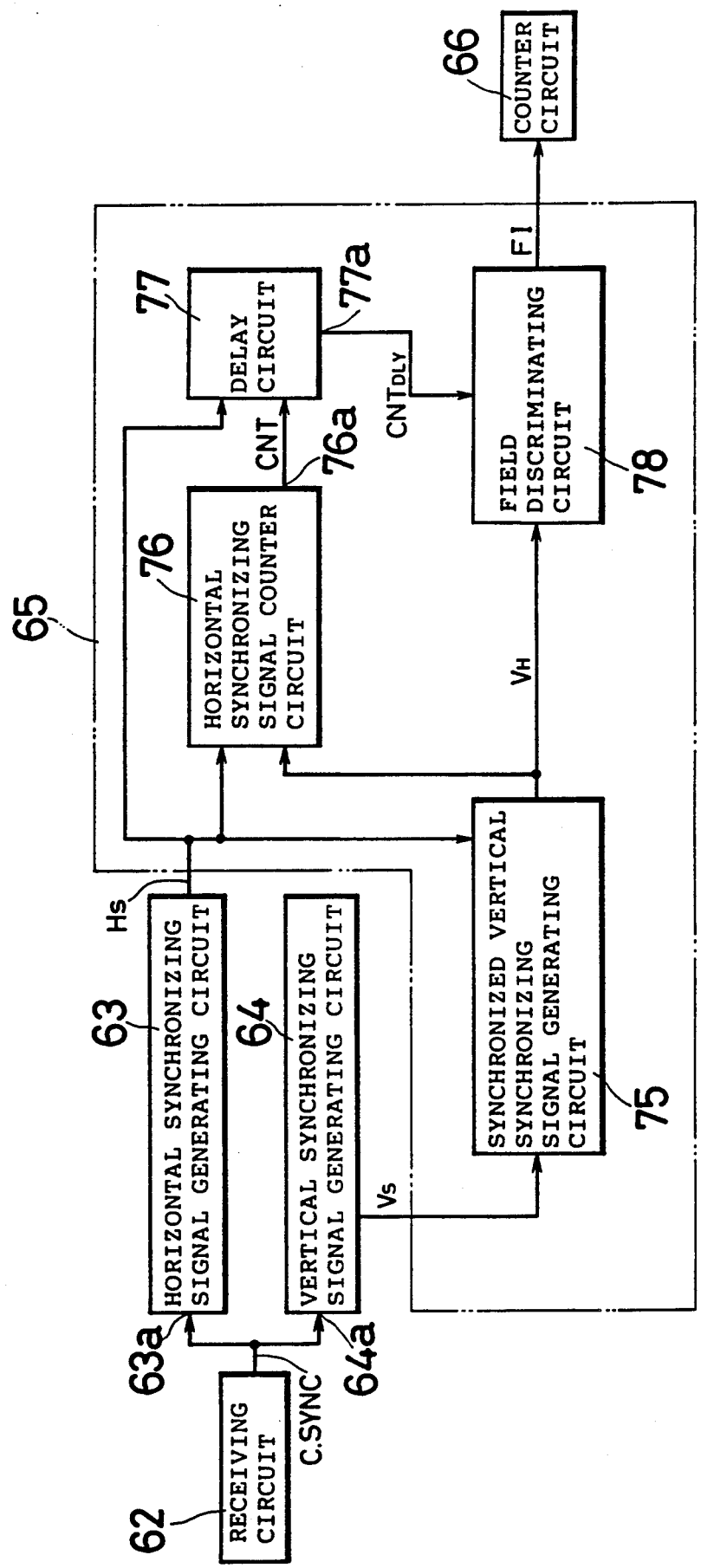
FIG. 20 is a block diagram showing a field discriminating device representing one embodiment of the invention.

Next, the circuit arrangement and operation of the field discriminating circuit 65 will be explained in further detail. FIG. 20 is a block diagram of a field discriminating device representing one embodiment of the invention. In FIG. 20, composite synchronizing signals C. SYNC, provided from the receiving circuit 62, are applied to respective input terminals 63a and 64a of the horizontal synchronizing signal generating circuit 63 and the vertical synchronizing signal generating circuit 64. A vertical synchronizing signal Vs, at the output of the vertical synchronizing signal generating circuit 64, and a horizontal synchronizing signal Hs at the output of the horizontal signal generating circuit 63, are not simultaneously provided. Therefore, on the basis of the horizontal synchronizing signal Hs and the vertical synchronizing signal Vs, a synchronized vertical synchronizing signal generating circuit 75 generates and provides a synchronized vertical synchronizing signal $V_H$, in synchronism with a horizontal synchronizing signal Hs, immediately after the vertical synchronizing signal Vs.

After initialization by the synchronized vertical synchronizing signal $V_H$, a horizontal synchronizing signal counter circuit 76 counts the number of pulses of the horizontal synchronizing signal Hs. An output signal CNT, the result of the counting, from the horizontal synchronizing signal counter circuit 76, delays (or the time corresponding to one line of horizontal synchronizing signals), for the horizontal synchronizing signal Hs, by one cycle time, in a delay circuit 77.

A field discriminating circuit 78 detects output signal $CNT_{DLY}$ from the delay circuit 77 at the time of pulse generation for synchronized vertical synchronizing signal $V_H$. On the basis of the output signal $CNT_{DLY}$, a field discriminating signal FI is provided from output terminal 78a of the field discriminating circuit 78.

The field discriminating circuit 78 uses composite synchronizing signals C. SYNC only as original signals. It does not require any other signals, such as frequency multiplication signals of horizontal synchronizing frequency and color subcarrier.

Figure 8:
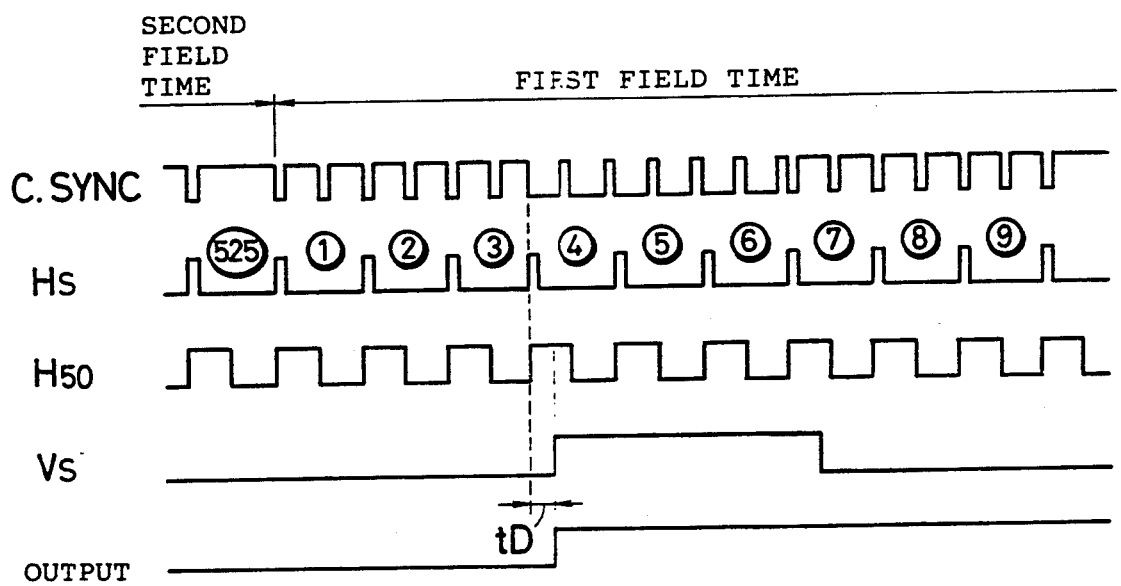
FIGS. 8 and 9 are diagrams showing input signal wave forms in FIG. 7 diagram and signal wave forms at various parts.
Figure 9:
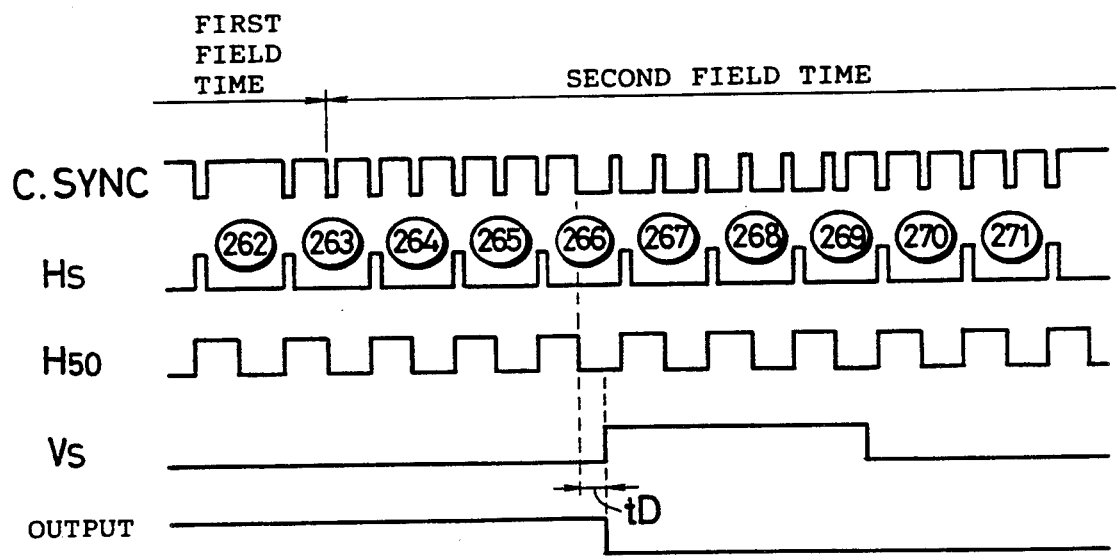
Figure 10:
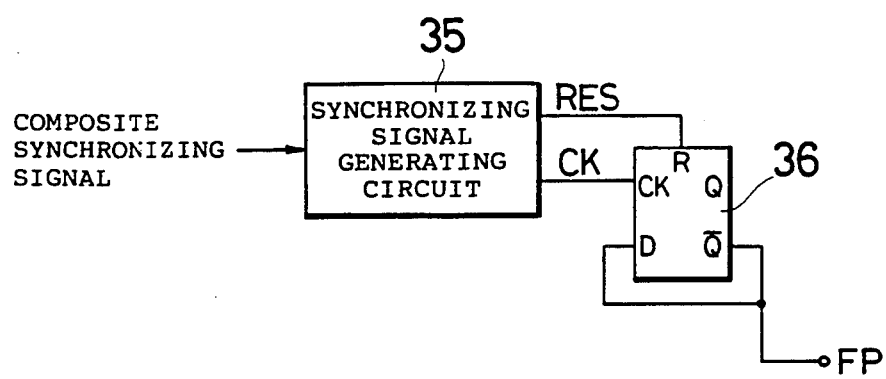
FIG. 10 is a block diagram showing the arrangement of the conventional field discriminating device.
Figure 11:
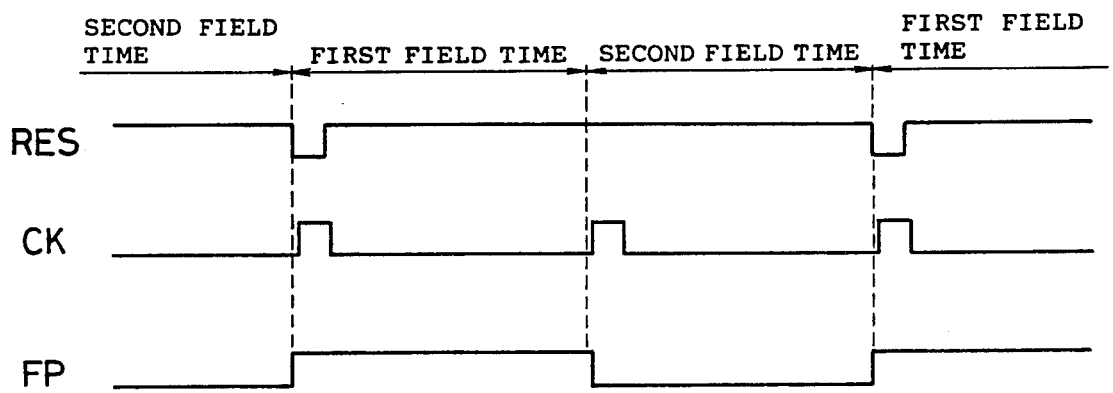
FIG. 11 is a timing chart showing the operation of the FIG. 10 field discriminating device.
Figure 12:
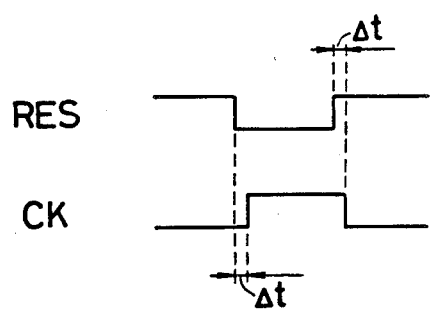
FIG. 12 is a timing chart showing phase relations of two synchronizing signals in the field discriminating device shown in FIG. 11.
Figure 13A:
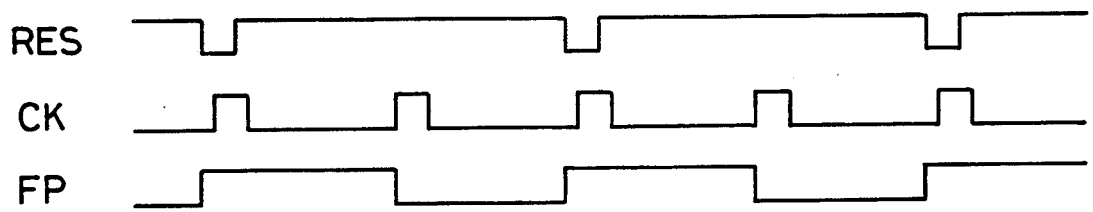
FIGS. 13A to 13D are timing charts showing malfunction cases in comparison with the case of normal operation in the FIG. 10 field discriminating device.
Figure 13B:
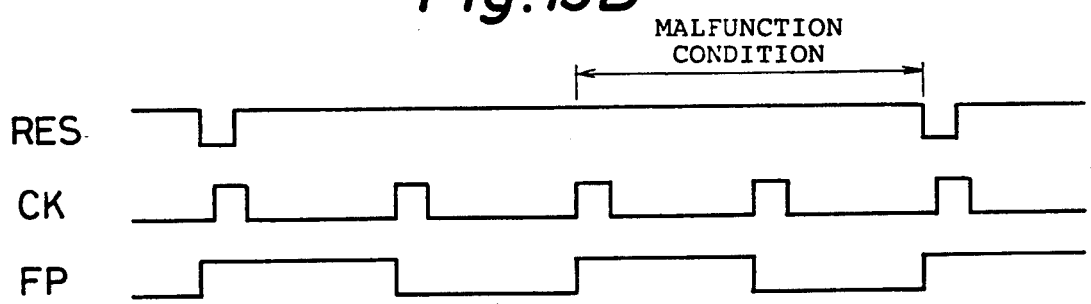
Figure 13C:
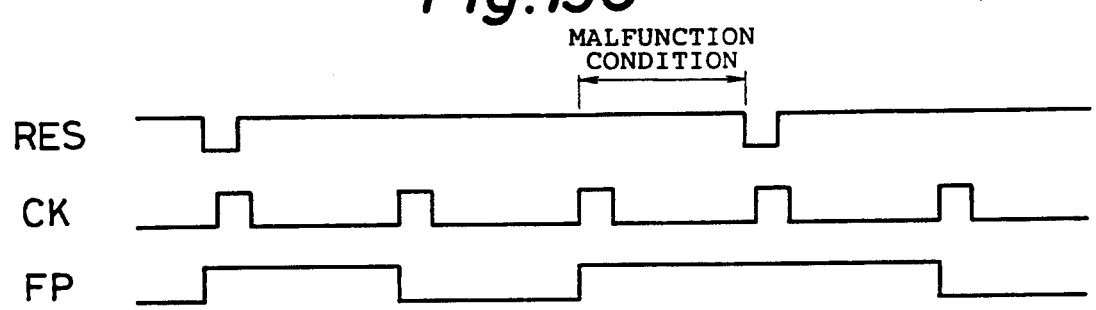
Figure 13D:
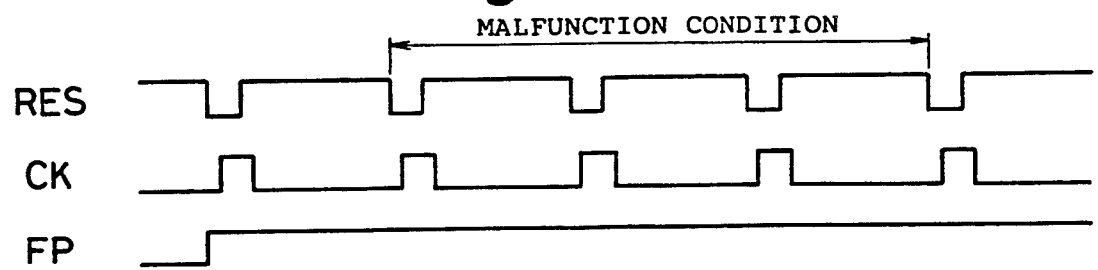
Figure 21:
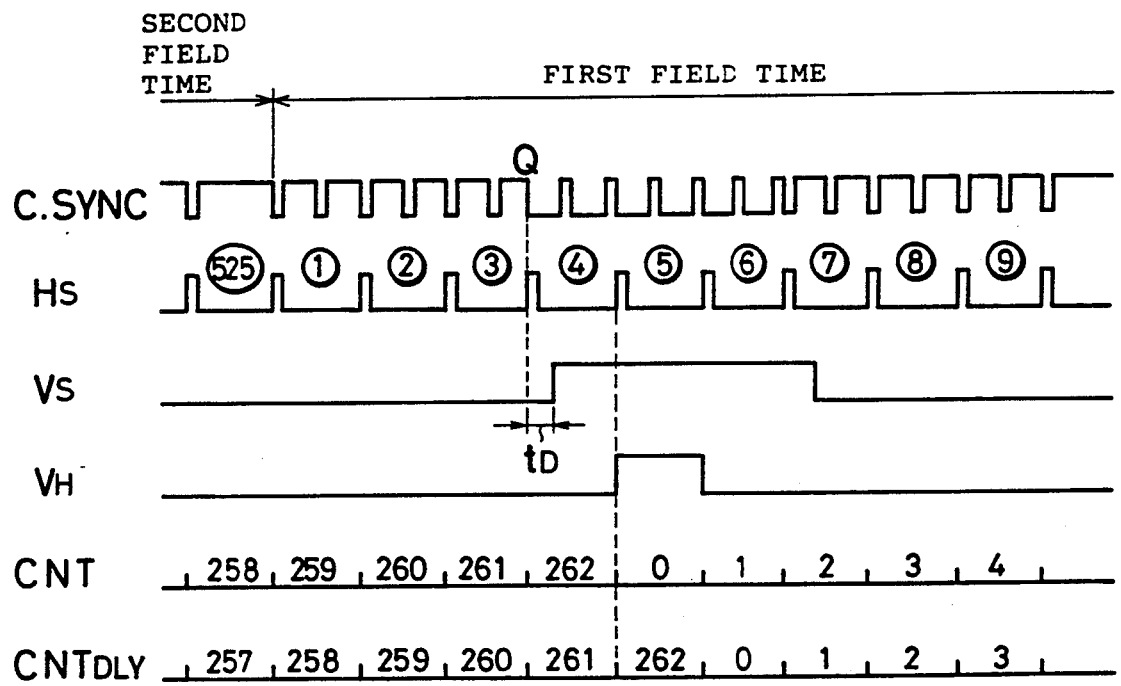
FIGS. 21 and 22 are wave form diagrams for explanation of input and output signals in the FIG. 20 block diagram.
Figure 22:
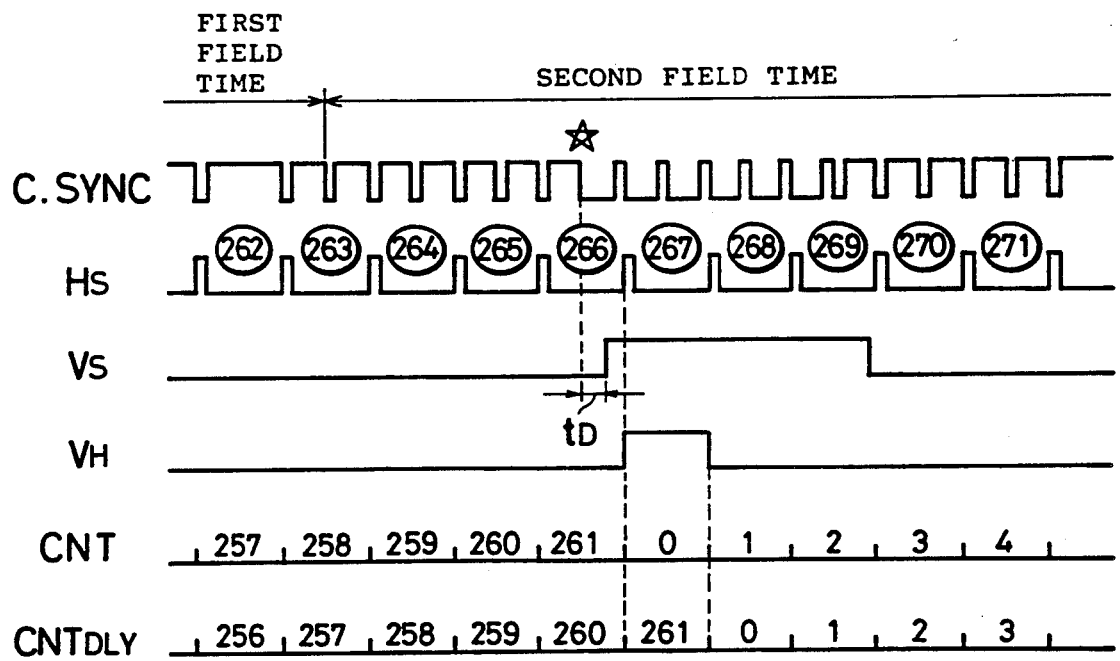

FIGS. 21 and 22 are timing charts for further explanation of the operation aspects shown in the block diagram of FIG. 20. At the stage of generating vertical synchronizing signal Vs, if the amount of delay ($t_D$ in FIG. 21), relative to composite synchronizing signal C. SYNC, is set at a value below ½ of one cycle (1H) of horizontal synchronizing signal, the synchronized vertical synchronizing signal $V_H$ is a pulse signal having a delay of a certain time relative to the time point of its primary vertical synchronizing time (point of time Q in FIG. 21). The quantity of delay is 1 H during first field time and ½H during second field time. As shown, horizontal scanning times are individually designated by numbers as in FIGS. 8 and 9. The pulse of the first synchronized vertical synchronizing signal $V_H$ for the first field time corresponds to the fifth line and the first synchronized vertical synchronizing signal $V_H$ for the second field time corresponds to the 267th line (NTSC).

Now, each pulse of synchronized vertical synchronizing signal $V_H$ is taken as a leading point of each field time and the period of from generation, each synchronized vertical synchronizing signal $V_H$ and just before generation of a next synchronized vertical synchronizing signal $V_H$, is taken as one field time. Then, if the number of lines in a first field time is compared with that in a second field time, and it is found that there is a one line difference between the two fields with 262 lines (5th to 266th) in the first field time and 263 lines (267th to 525th) in the second field time. Accordingly, if, after the horizontal synchronizing signal counter circuit 76 is reset, the pulse number of the horizontal synchronizing signal Hs is counted. The counted number for the first field time is found to be different from that for the second field time in a line just prior to generation of a next synchronized vertical synchronizing signal $V_H$ (output terminal 76a of the horizontal synchronizing signal counter circuit 76; CNT in FIGS. 21 and 22). If this timing relation is delayed one cycle (1 line) of horizontal synchronizing signal Hs, the above noted difference in a line just prior to generation of synchronized vertical synchronizing signal $V_H$ moves to the point in time of generation of the synchronized vertical synchronizing signal $V_H$ (output terminal 77a of the delay circuit 77; $CNT_{DLY}$ in FIGS. 21 and 22). Therefore, by detecting the output signal $CNT_{DLY}$ from the delay circuit 77 at the point in time of generation of the synchronized vertical synchronizing signal $V_H$, it is possible to discriminate the field times from one another and thus to obtain a field discriminating signal FI.

To sum up, the field discriminating device of the invention operates such that a vertical synchronizing signal Vs at a leading point of each field time is synchronized with a horizontal synchronizing signal Hs and numbers of lines in the first and second field times are integerized. Then the difference in the number of lines between the first and second fields is detected for field discrimination.

Figure 23:
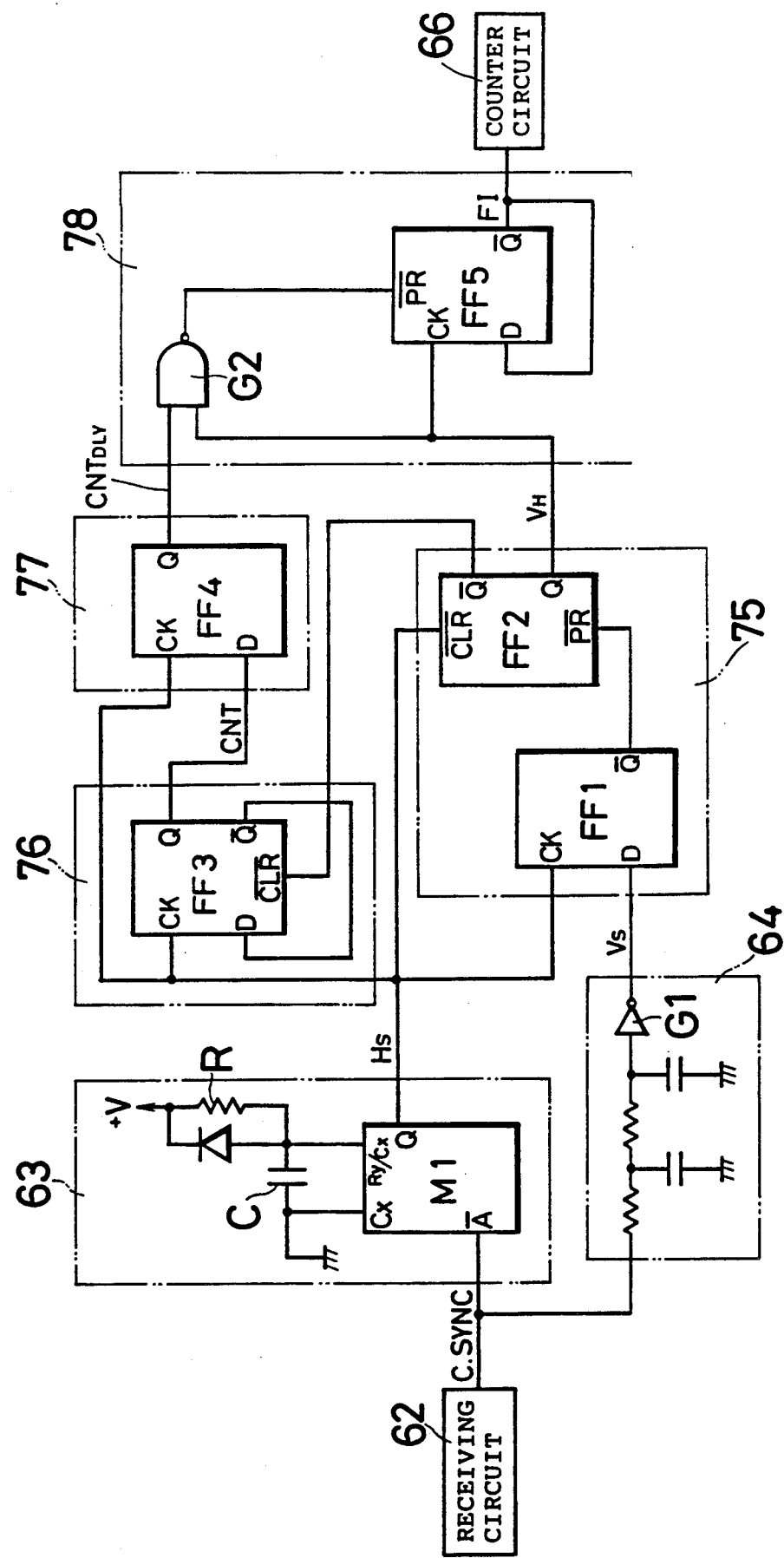
FIG. 23 is a circuit diagram showing a field discriminating device as one embodiment of the invention.
Figure 24:
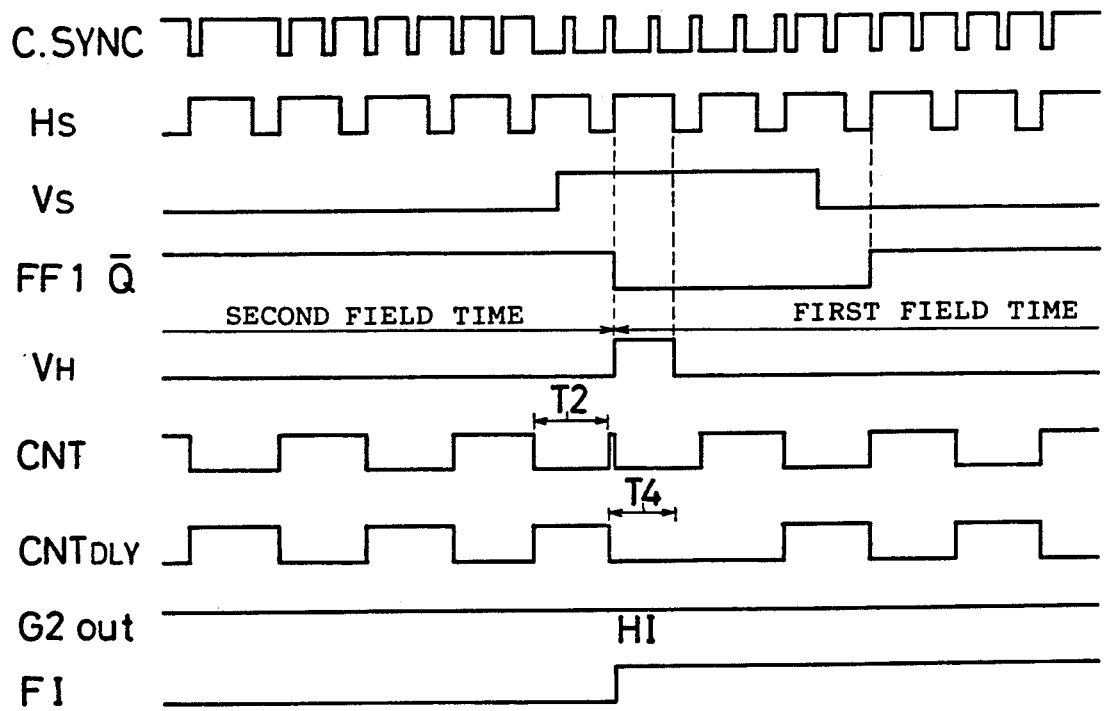
FIGS. 24 and 25 are signal wave form diagram for explanation of operation of the circuit shown in FIG. 23.
Figure 25:
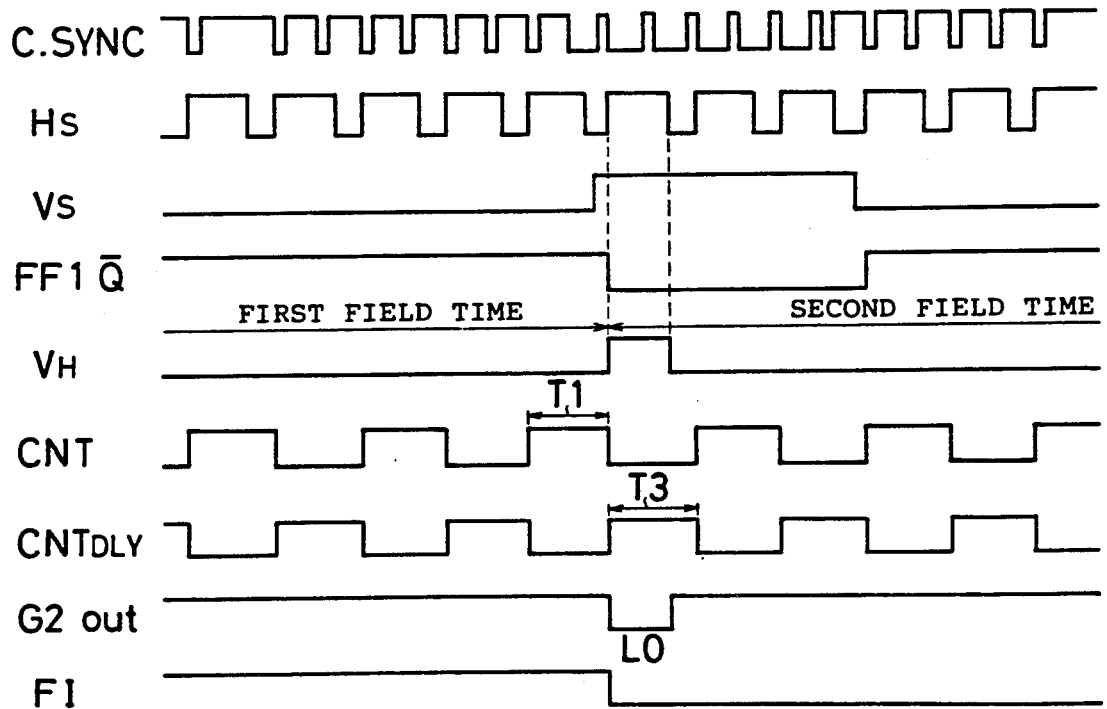

FIG. 23 is a concrete circuit diagram for the field discriminating device in FIG. 20, and FIGS. 24 and 25 are signal wave form diagrams for explaining operation of circuits shown in FIG. 23.

A composite synchronizing signal, an input signal, is sent to a one-shot multivibrator M1 in the horizontal synchronizing signal generating circuit 63 and also to an integrating circuit in the vertical synchronizing signal generating circuit 64. Thus a separation of horizontal and vertical synchronizing signals is carried out. In the horizontal synchronizing signal generating circuit 63, in which values for resistor R and capacitor C of the multivibrator M1 are suitably predetermined, pulses other than horizontal synchronizing signal (serrated 00 pulses as equalizing pulses for repetition synchronizing), are removed. Thus a horizontal synchronizing signal Hs of single frequency is obtained. Meanwhile, in the integrating circuit of the vertical synchronizing signal generating circuit 64, a vertical synchronizing signal Vs is extracted. Then, in the flip-flops FF1, FF2 of the synchronized vertical synchronizing signal generating circuit 75, a synchronized vertical synchronizing signal $V_H$, in synchronism with the horizontal synchronizing signal Hs, is obtained.

Thereafter, the number of lines in the field time is counted. In actual practice, however, it is only necessary to detect 1 horizontal time representing the difference between the number of lines in the first field time and that in the second field time. In this embodiment, therefore, the arrangement is substantially such that frequency division of horizontal synchronizing signal Hs is carried out at flip-flop FF3 to obtain a least significant bit of binary counter. The flip-flop FF3 is initialized by a synchronized vertical synchronizing signal $V_H$ provided from output terminal Q of the flip-flop FF2. In the final lines of the first and second field times, outputs CNT of the flip-flop FF3, as indicated at T1, T2 in FIGS. 24 and 25, are at a high level for the first field time and at a low level for the second field time. When signals to be transmitted from the flip-flop FF3 are delayed 1 horizontal line by flip-flop FF4 of the delay circuit 77, signals for time T1, T2 in FIGS. 24 and 25 are delayed to T3, T4 as $CNT_{DLY}$ indicates in FIGS. 24 and 25. That is, output $CNT_{DLY}$ of the flip-flop FF4 is different in value from L0, H1 according to the field time, first or second, when the synchronized vertical synchronizing signal $V_H$ is at a high level (leading point in each field).

Therefore, when a product of a synchronized vertical synchronizing signal $V_H$ and an output signal $CNT_{DLY}$ from flip-flop FF4 is taken in NAND circuit G2, the output of NAND circuit D2 provides a low level pulse at the leading point of the second field time. Then, the output from the NAND circuit G2 is applied to a reset terminal $\overline{PR}$ of flip-flop FF5 in which frequency division is carried out of the synchronized vertical synchronizing signal $V_H$. Then, a field discriminating signal F1 is provided as shown in FIGS. 24 and 25.

The above described field discriminating device is based on the NTSC standard, but it is equally applicable to systems according to other standards. In TV signalling of the interlaced scanning standard, it is required that scanning position be shifted according to the field. Therefore a vertical synchronizing signal for field one or the other is inserted by delaying the timing for it by ½H. For this reason, the number of lines for one field must be [N (integer)+½] and the number of lines for one frame must be an odd number.

As described above, the field discriminating device of the invention is characterized in that the number of lines in each field is counted and the difference in the number of lines between the first and second fields is detected. When the number of lines in one frame is an odd number, the numbers of lines of the first and second fields are not even, so that fields can be discriminated. Therefore, the invention is effectively applicable to TV signalling of any interlaced standard, including PAL (625 lines/frame) and SECAN (same).

Figure 26:
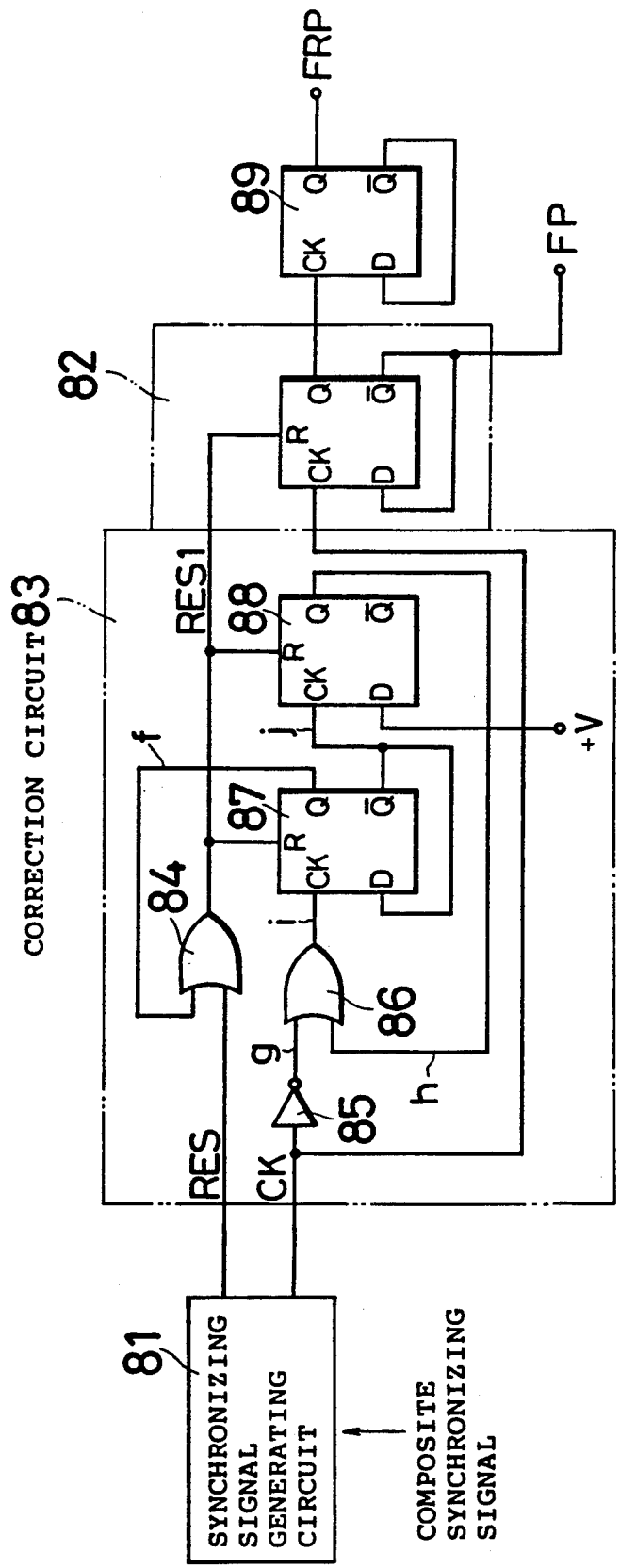
FIG. 26 is a block diagram showing one embodiment of the field discriminating device according to the invention.

Next, a field discriminating device representing one embodiment of the invention will be described. This device can provide field discriminating signals varying alternately from field time to field time, even when synchronized signals are erroneously provided. FIG. 26 is a block diagram showing the arrangement of the field discriminating device.

In FIG. 26, a synchronizing signal generating circuit 81 has exactly same function as that in the synchronizing signal generating circuit 35 in a conventional field discriminating device. This synchronizing signal generating circuit 81 generates a low level synchronizing signal RES at the leading point of time in each frame in response to a composite synchronizing signal C. SYNC added to a video signal of the interlaced standard. It also generates high level synchronizing signals CK in each of the first and second fields.

A correction circuit 83 corrects synchronizing signals RES when any synchronizing signal RES of the signals transmitted from the sychronizing signal generating circuit 81, namely RES and CK, is erroneous. This correction circuit 83 comprises an OR gate 84 which inputs a synchronizing signal RES, an inverter 85 which inverts a synchronizing signal CK, an OR gate 86 which inputs the output g of the inverter 85, a first D-flip-flop 87 which takes the output i of the OR gate 86 and inputs as a reset signal the output RES1 from the OR gate 84, and a second D-flip-flop 88 which uses as a clock signal the output j from an inversion output terminal $\overline{Q}$ of the first D-flip-flop 87.

Output f from a non-inversion output terminal Q of the first D-flip-flop 87 is given as another input of the OR gate 84. The output RES1 of the OR gate 84 is applied as a reset signal to the first D-flip-flop 87. Output j from the inversion output terminal $\overline{Q}$ of the first D-flip-flop 87 is given also as a data input of same D-flip-flop 87. Output h from a non-inversion output terminal Q of the second D-flip-flop 88 is given as another input of the OR gate 86, and a positive potential +V data is constantly given as a data input to the D-flip-flop 88.

In FIG. 26, the repetition signal output circuit 82 has same function as that of the discriminating signal circuit 36 in the above noted conventional field discriminating device. This discriminating signal output circuit 82 receives output RES1 from the OR gate 84 of the correction circuit 83, or a corrected version of synchronizing signal RES, and a synchronizing signal CK provided from the synchronizing signal generating circuit 81, and provides a field discriminating signal FP. In this embodiment, the circuit is comprised of D-flip-flops.

Output RES1 from the OR gate 84 is transmitted as a reset signal to one of the D-flip-flops, and a synchronizing signal is given as a clock signal. An inversion output terminal $\overline{Q}$ of the D-flip-flop is connected to a data input terminal D to which a field discriminating signal FP is provided from the inversion output terminal $\overline{Q}$.

In a next stage of the discriminating signal output circuit 82, there is provided a D-flip-flop 89 for doubling the repetition frequency of the field discriminating signal FP. Output from the non-inversion output terminal Q of the discriminating signal output circuit 82 is transmitted as a clock signal to the D-flip-flop 89. Signals representing the result of the frequency division, that is, frame discriminating signals FRP, are provided from a non-inversion output terminal Q of the D-flip-flop 89. The inversion output terminal $\overline{Q}$ of the D-flip-flop 89 is connected to a data input terminal D of same D-flip-flop 89.

Figure 27:
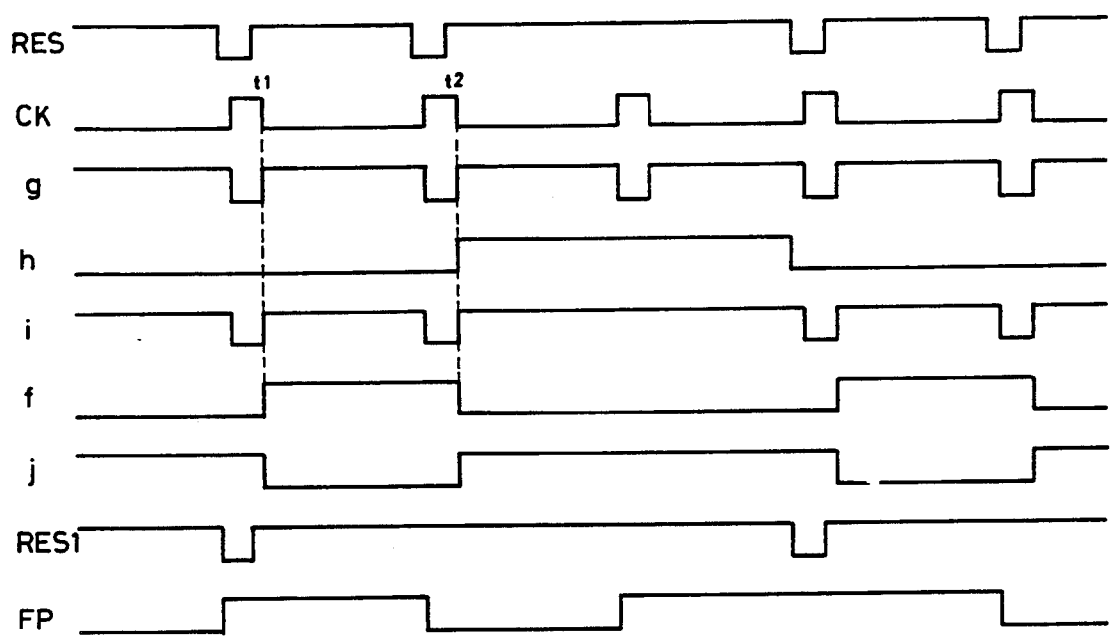
FIG. 27 is a timing chart showing operation of the field discriminating device.
Figure 28:
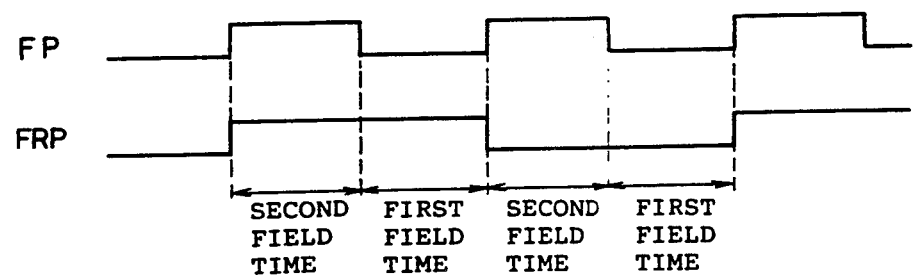
FIG. 28 is a timing chart showing phase relations of field discriminating signals and frame discriminating signals provided from the field discriminating circuit.

FIG. 27 is a timing chart showing the operation of the field discriminating device. FIG. 28 is a timing chart showing the phase relation between the field discriminating signals FP supplied from the discriminating signal output circuit 82 and the frame discriminating signals from the D-flip-flop 89.

Operation of the field discriminating device will now be described with reference to FIGS. 27 and 28.

Figure 1:
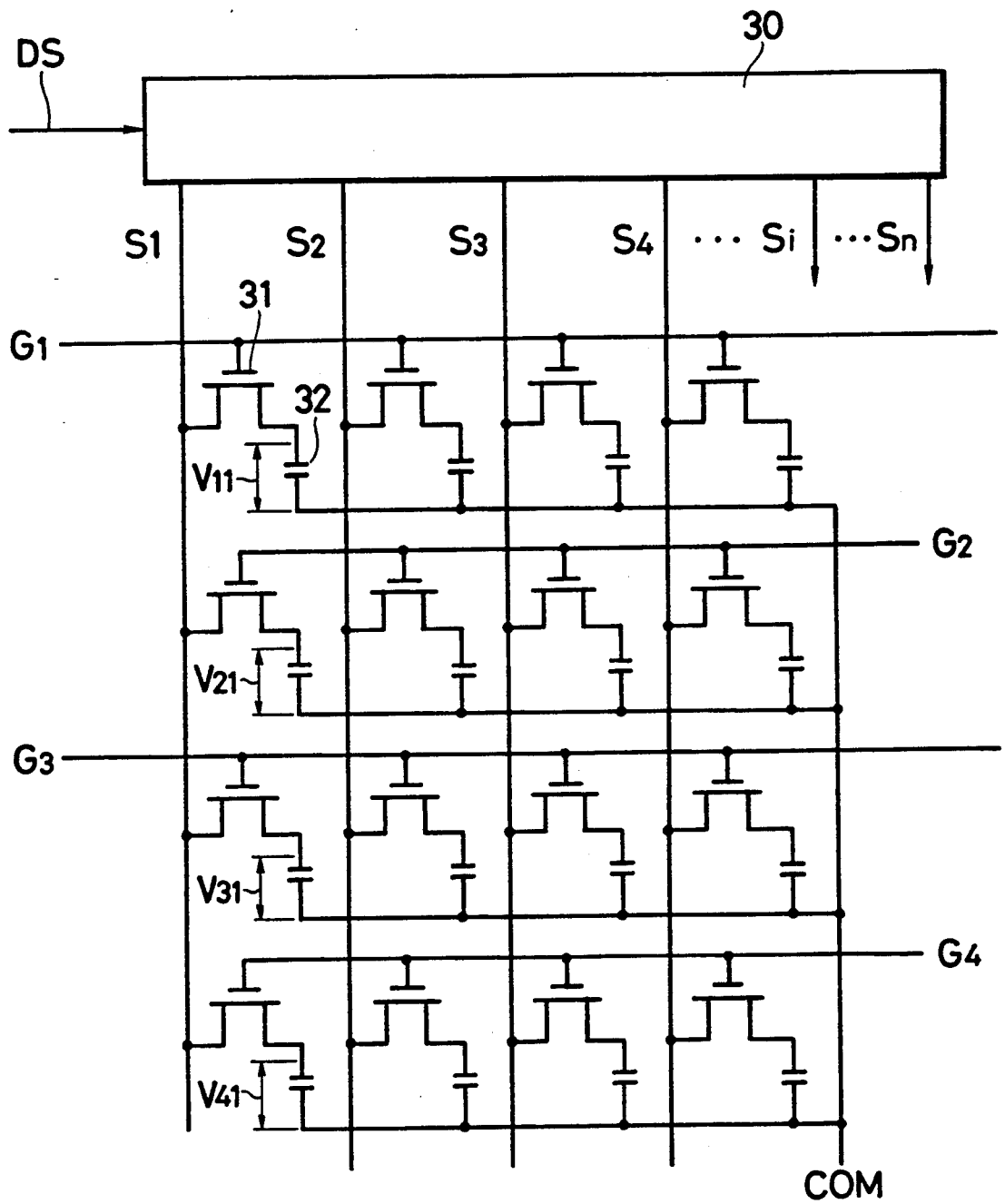
FIG. 1 is an equivalent circuit diagram for a conventional active matrix type liquid crystal display device.
Figure 2:
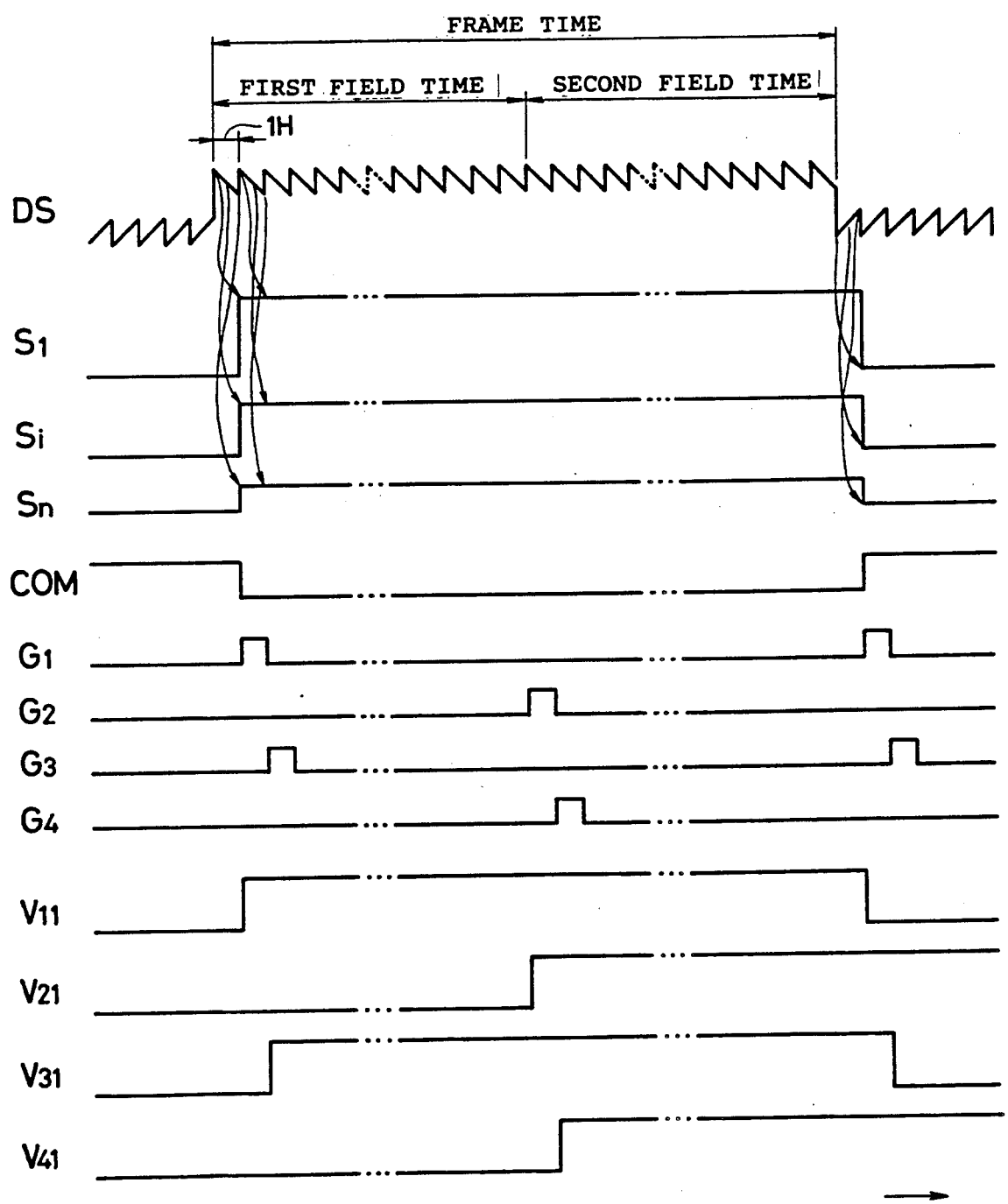
FIG. 2 is a diagram showing signal wave forms applied at various parts of the liquid crystal display device in FIG. 1.
Figure 3:
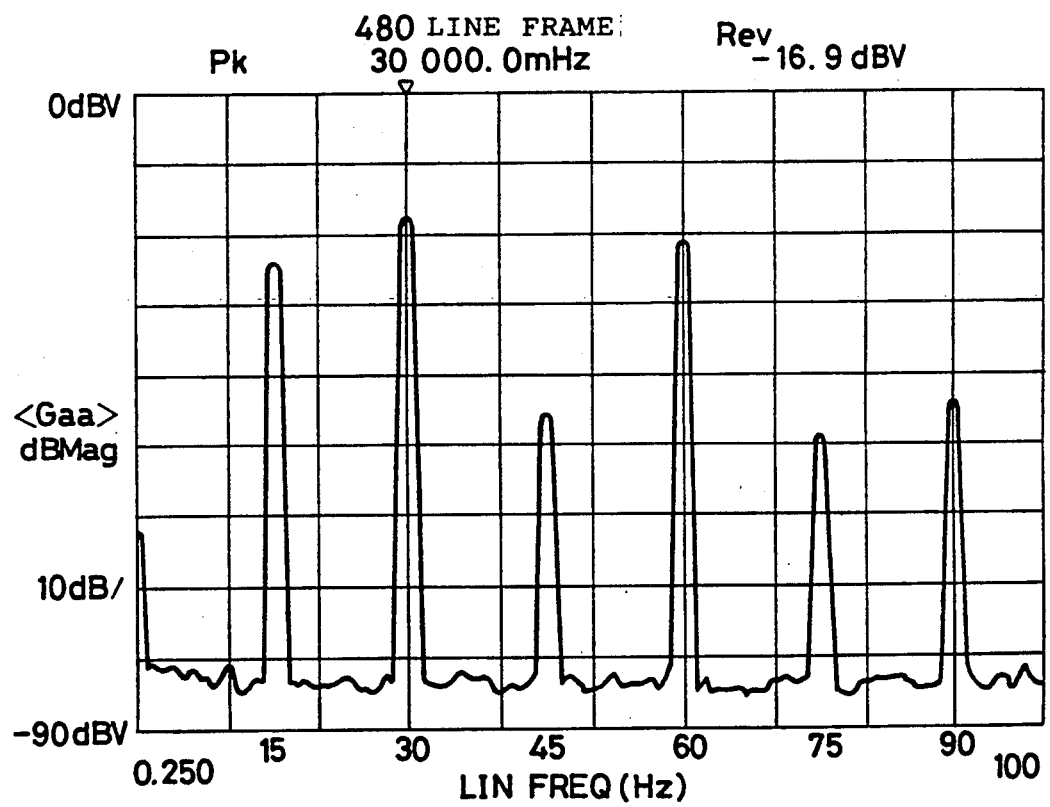
FIG. 3 is an optical spectral view with respect to a conventional frame reversal drive system.
Figure 4:
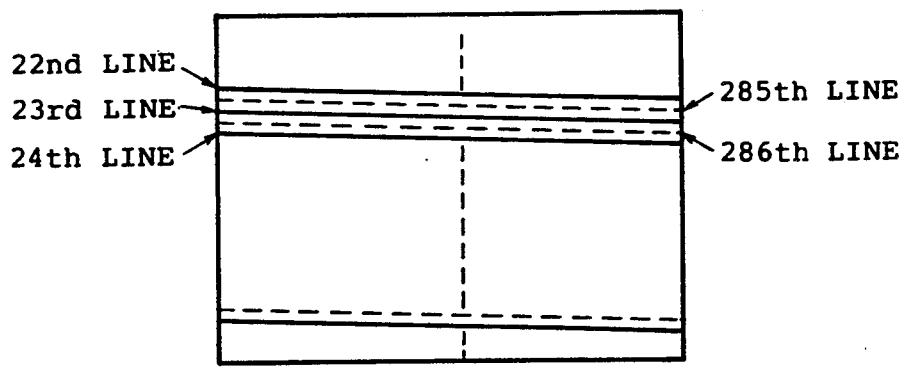
FIG. 4 is an explanatory view of interlaced scanning.
Figure 5:
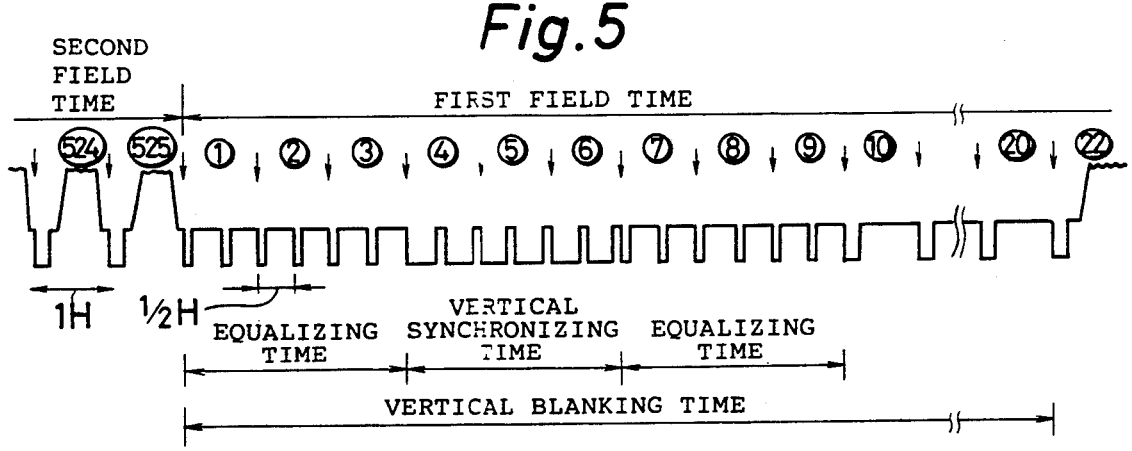
FIGS. 5 and 6 are explanatory views illustrating composite video signals.
Figure 6:
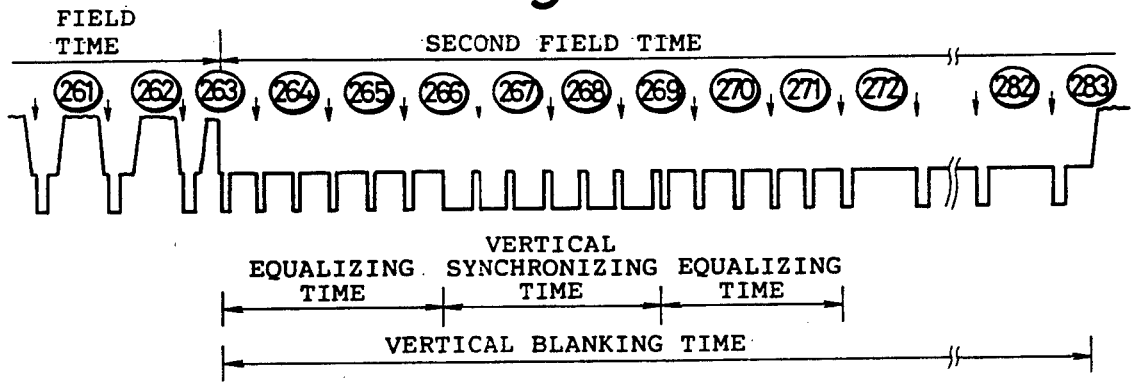
Figure 7:
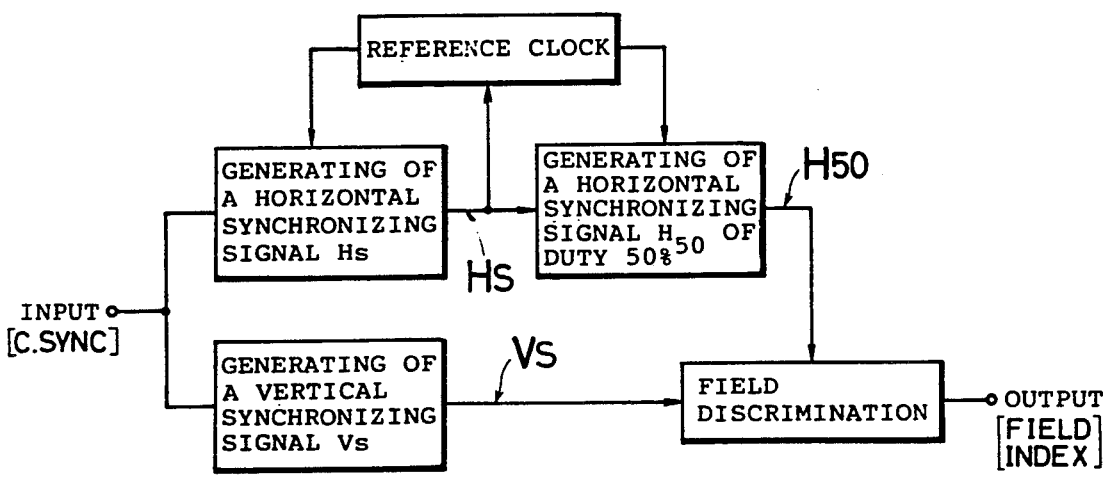
FIG. 7 is a block diagram illustrating a conventional field discriminating circuit.

As FIG. 27 shows, it is assumed that one field after one synchronizing signal RES is provided an as erroneous synchronizing signal RES, provided from the synchronizing signal generating circuit 81. A synchronizing signal CK is inverted by the inverter 85 as FIG. 2 shows, and an inverted signal g from the inverter and output h from the D-flip-flop 88 are applied as clock signals to the D-flip-flop 87 through the OR gate 86.

In a portion in which a first synchronizing signal RES is provided, the output f of the D-flip-flop 87 is shifted from low level to high level at a rise time of signal i, that is, fall time t1 of the synchronizing signal CK. Subsequently, at a rise time of a next signal i, that is, fall time t2 of a next synchronizing signal CK, output f of the D-flip-flop 87 is shifted from a high level to a low level.

In other words, for a period from time t1 to time t2, output f of the D-flip-flop 87 is kept at a high level, of which the output f is given as one input to the OR gate 84.

A synchronizing signal RES is given as another input to the OR gate. Any signal provided in the vicinity of time t2 for the synchronizing signal RES is an erroneous signal. However, for the period of time t1 to t2, signal f is kept at a high level and. Therefore, an erroneous synchronizing signal RES (low level), if any, which occurred in the visinity of time t2, is cancelled by the signal f. In other words, signal f acts as a masking signal for cancelling low level synchronizing signals erroneously provided.

In same way, if an erroneous signal RES is provided in one field after a synchronizing signal is outputted, the signal f acts as a masking signal so that the error is corrected. Thus, a corrected signal RES1 of the erroneous signal is as shown in FIG. 27. Therefore, even in the case of a malfunction such that a synchronizing signal RES is provided for each field, a corrected version of an erroneous signal is generated only for each frame.

In the discriminating signal output circuit 82, the corrected signal RES1 is received as a reset signal and a synchronizing signal CK provided from the synchronizing signal generating circuit 81 is received as a clock signal as it is. Thus, a field discriminating signal FP, as shown in FIG. 2, is provided from the inversion output terminal $\overline{Q}$ of the circuit 82. In the next-stage D-flip-flop 89, a signal provided from the non-inversion output Q of the discriminating signal output circuit 82 is received as a clock signal. Further, frame discriminating signal FRP, which has a double repetition frequency of the field discriminating signal FP, is provided from the non-inversion output terminal Q of the D-flip-flop 89.

Figure 29A:
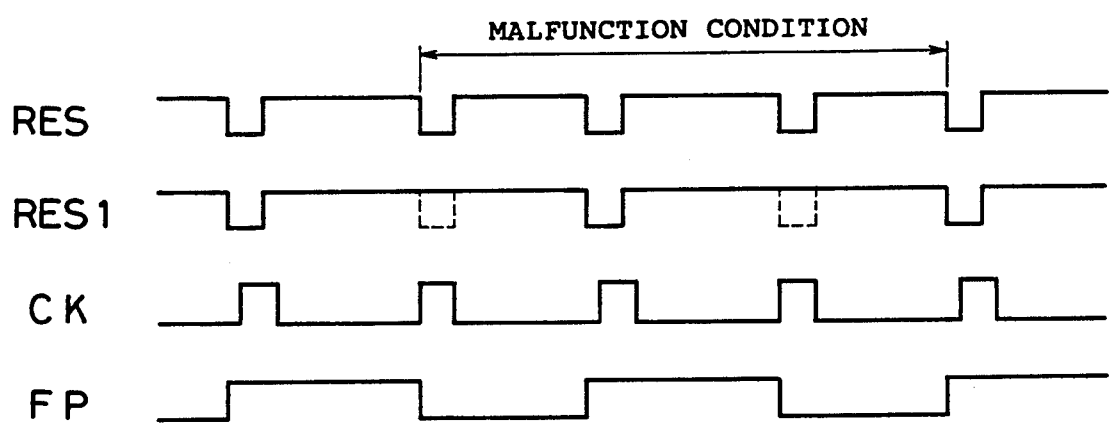
FIGS. 29A and 29B are timing charts showing correction operation in case of malfunctions at the field discriminating device.
Figure 29B:
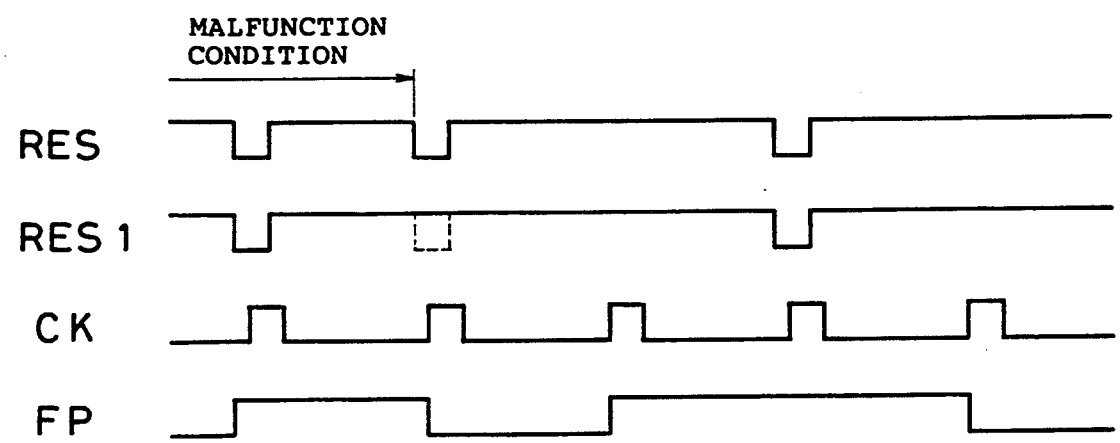

FIGS. 29A and 29B are timing charts showing the correcting operation of the field discriminating device with respect to erroneous values.

FIG. 29A shows a correcting operation, in the case of a malfunction, where a synchronizing signal RES has occurred for each field. It can be seen that an erroneous synchronizing signal RES in one field, after one synchronizing signal RES was provided, is accurately eliminated in a corrected signal RES1. Thus, field discriminating signals are in such a wave form as shown in FIG. 29A, in which a level is changed from field to field. Therefore, when this field discriminating device is employed in driving a display device such as a liquid crystal display device, unfavorable occurrences, such as one field biased display, can be accurately prevented.

FIG. 29B shows the manner of operation when returning from malfunction condition to normal operation. One field after a synchronizing signal RES is provided, a synchronizing signal RES provided is eliminated in a corrected signal RES1 of same. In this case, a next synchronizing signal RES is delayed by one field, so that in field discriminating signals FP, the level of the signals is constant over partially continued fields. However, thereafter the level of the field discriminating signals FP is changed alternately from field to field.

From the above described embodiments of the present invention, it is apparent that the present invention may be modified as would occur to one of ordinary skill in the art without departing from the spirit and scope of the present invention which should be defined solely by the appendent claims. Changes and modifications of the system contemplated by the present preferred embodiment will be apparent to one of ordinary skill in the art.

What is claimed is:

1. A display drive system for driving a liquid crystal display device having a plurality of scanning and data electrodes arranged in a matrix format which utilizes interlaced scanning for a plurality of fields to achieve video display, said system comprising:

receiving means for receiving input video signals;

horizontal synchronizing means for generating a horizontal synchronizing signal (Hs) from said input video signals;

vertical synchronizing means for generating a vertical synchronizing signal (Vs) from said input video signals;

field discriminating means for generating a field discriminating signal which discriminates input video signals of a first field from input video signals of a second field;

first driving means for applying a driving voltage of a first polarity to drive a plurality of the scanning electrodes of said liquid crystal display in response to said input video signals of a first field, as discriminated by said field discriminating signal; and second driving means for inverting said driving voltage and applying a driving voltage of a second polarity to drive a plurality of the scanning electrodes of said liquid crystal display in response to said input video signals of a second field to thereby achieve video display of said input video signals, as discriminated by said field discriminating signal;

said field discriminating means including, synchronized vertical synchronizing signal means for generating a vertical signal ($V_H$) in synchronism with said horizontal synchronizing signal from an input of Vs and Hs, counting means, responsive to Hs, for counting the number of pulses in said horizontal synchronizing signal, delay means for delaying said horizontal counted number of pulses of said horizontal synchronizing signal by one pulse to generate $CNT_{DLY}$, and field discriminating circuit means for generating said field discriminating signal in response to an input of $V_H$ and $CNT_{DLY}$.

2. A system, as claimed in claim 1, wherein said field discriminating circuit means includes, a NAND gate to produce a signal (G2), from the input of $V_H$ and $CNT_{DLY}$, which has a logical "0" output at the beginning of the second field and a logical "1" output at all other times; and a flip-flop, which receives G2 and generates said field discriminating signal which goes from logical "1" during said first field to logical "0" during said second field to thereby discriminate said first and second fields.

3. A system, as claimed in claim 1, wherein said first driving means drives the odd number scanning electrodes of said liquid crystal display and said second driving means drives said even number scanning electrodes of said liquid crystal display.

4. A system, as claimed in claim 1, wherein said synchronized vertical synchronizing signal means, said counting means, and said delay means comprise a plurality of flip-flops.

5. A system, as claimed in claim 1, wherein said liquid crystal display is an active matrix type liquid crystal display comprising a plurality of liquid crystal cells, each individually connected to switching elements at the intersection of each of the scanning and data electrodes, through which said driving voltage is applied to thereby display said input video signals.

6. A system, as claimed in claim 5, wherein said switching elements are thin-film transistors.

* * * * *